(12) United States Patent
Toigawa et al.

(10) Patent No.: US 12,487,440 B2
(45) Date of Patent: Dec. 2, 2025

(54) MICROSCOPE SYSTEM, SUPERIMPOSING UNIT, AND OPERATION METHOD

(71) Applicant: Evident Corporation, Tatsuno-machi (JP)

(72) Inventors: Yoshihiro Toigawa, Nagano (JP); Sho Makita, Nagano (JP); Yosuke Tani, Nagano (JP); Yuki Arai, Nagano (JP)

(73) Assignee: Evident Corporation, Nagano (JP)

( * ) Notice: Subject to any disclaimer, the term of this patent is extended or adjusted under 35 U.S.C. 154(b) by 343 days.

(21) Appl. No.: 18/114,918

(22) Filed: Feb. 27, 2023

(65) Prior Publication Data

US 2023/0288691 A1    Sep. 14, 2023

(30) Foreign Application Priority Data

Mar. 8, 2022    (JP) .................................. 2022-035427

(51) Int. Cl.
*G02B 21/36*    (2006.01)
*G02B 21/34*    (2006.01)

(52) U.S. Cl.
CPC .......... *G02B 21/367* (2013.01); *G02B 21/34* (2013.01); *G02B 21/361* (2013.01)

(58) Field of Classification Search
CPC .. G02B 21/367; G02B 21/365; G02B 21/361; G02B 21/34
See application file for complete search history.

(56) References Cited

U.S. PATENT DOCUMENTS

| | | |
|---|---|---|
| 2011/0141262 A1 | 6/2011 | Ernsperger et al. |
| 2021/0018742 A1 | 1/2021 | Stumpe |
| 2021/0191101 A1* | 6/2021 | Kabeya ................ G02B 21/368 |
| 2021/0192179 A1 | 6/2021 | Nakata et al. |
| 2021/0192181 A1* | 6/2021 | Yoneyama ............ G06T 7/0014 |
| 2021/0215923 A1* | 7/2021 | Nakata ................ G02B 21/025 |
| 2021/0396675 A1 | 12/2021 | Ikeda et al. |

FOREIGN PATENT DOCUMENTS

| | | |
|---|---|---|
| JP | H08107902 A | 4/1996 |
| JP | 2011523100 A | 8/2011 |
| JP | 2020144109 A | 9/2020 |
| JP | 2021515240 A | 6/2021 |
| WO | 2020066041 A1 | 4/2020 |
| WO | 2020066042 A1 | 4/2020 |
| WO | 2020249236 A1 | 12/2020 |

OTHER PUBLICATIONS

Japanese Office Action (and an English language translation thereof) dated Sep. 2, 2025, issued in counterpart Japanese Application No. 2022-035427.

* cited by examiner

*Primary Examiner* — Kathleen V Nguyen
(74) *Attorney, Agent, or Firm* — Holtz, Holtz & Volek PC

(57) ABSTRACT

A microscope system includes: a microscope optical system that includes an ocular lens and forms an optical image of a sample on an object side of the ocular lens; a processor that generates auxiliary image data based on information regarding a target slide selected from among a plurality of ordered slides included in a slide set; and a superimposing device that superimposes, based on the auxiliary image data, an auxiliary image including the target slide on an image plane on which the optical image is formed. The processor selects, in response to an instruction to switch the target slide, a slide determined according to a first order in which the plurality of slides are ordered as a new target slide.

21 Claims, 41 Drawing Sheets

MICROSCOPE SYSTEM, SUPERIMPOSING UNIT, AND OPERATION METHOD

CROSS REFERENCE TO RELATED APPLICATIONS

This application is based upon and claims the benefit of priority from prior Japanese Patent Application No. 2022-035427, filed Mar. 8, 2022, the entire contents of which are incorporated herein by this reference.

TECHNICAL FIELD

The present disclosure relates to a microscope system, a superimposing unit, and an operation method.

BACKGROUND

Even at present when automation of work by a robot or the like progresses, there are many products required to be manually assembled. A medical device is an example of the products. Assembly of precision devices such as medical devices is often performed under a microscope because of a lot of detailed work, and a stereomicroscope capable of stereoscopically viewing an object with both eyes is often used.

However, in order to check a procedure manual during the assembly work while observing the object with the stereomicroscope, the eyes need to be temporarily separated from an ocular lens of the stereomicroscope, and the line of sight needs to be moved to a display or the like on which the procedure manual is displayed. Then, after the checking, the assembly work is continued by looking into the ocular lens again, so that the work efficiency is hardly increased.

A technique related to such a problem is described in, for example, WO 2020/066041 A. In a system described in WO 2020/066041 A, by projecting an image at an intermediate image position of a microscope, necessary information can be obtained while looking into an ocular lens.

SUMMARY

A microscope system according to an aspect of the present invention includes: a microscope optical system that includes an ocular lens and forms an optical image of a sample on an object side of the ocular lens; a processor that generates auxiliary image data based on information regarding a target slide selected from among a plurality of ordered slides included in a slide set; and a superimposing device that superimposes, based on the auxiliary image data, an auxiliary image including the target slide on an image plane on which the optical image is formed. The processor selects, in response to an instruction to switch the target slide, a slide determined according to a first order in which the plurality of slides are ordered as a new target slide.

A superimposing unit according to another aspect of the present invention is attached to a microscope including a microscope optical system that forms an optical image of a sample on an object side of an ocular lens, the superimposing unit including: a processor that generates auxiliary image data based on information regarding a target slide selected from among a plurality of ordered slides included in a slide set; and a superimposing device that superimposes, based on the auxiliary image data, an auxiliary image including the target slide on an image plane on which the optical image is formed. The processor selects, in response to an instruction to switch the target slide, a slide determined according to a first order in which the plurality of slides are ordered as a new target slide.

An operation method according to an aspect of the present invention is an operation method of a control device that controls a microscope including a superimposing device and a microscope optical system that forms an optical image of a sample on an object side of an ocular lens, the operation method including: causing a processor of the control device to select, in response to an instruction to switch a target slide selected from among a plurality of ordered slides included in a slide set, a slide determined according to a first order in which the plurality of slides are ordered as a new target slide; causing the processor to generate auxiliary image data based on information regarding the new target slide; and causing the superimposing device to superimpose, based on the auxiliary image data, an auxiliary image including the new target slide on an image plane on which the optical image is formed.

BRIEF DESCRIPTION OF DRAWINGS

The present invention will be more apparent from the following detailed description when the accompanying drawings are referenced.

DESCRIPTION OF EMBODIMENTS

By the way, in a case where assembly work including a plurality of processes is assumed, it is desirable to appropriately switch and display appropriate information at a necessary timing, instead of displaying specific information at all times.

In view of the above circumstances, embodiments of the present invention will be described.

Figure 1:
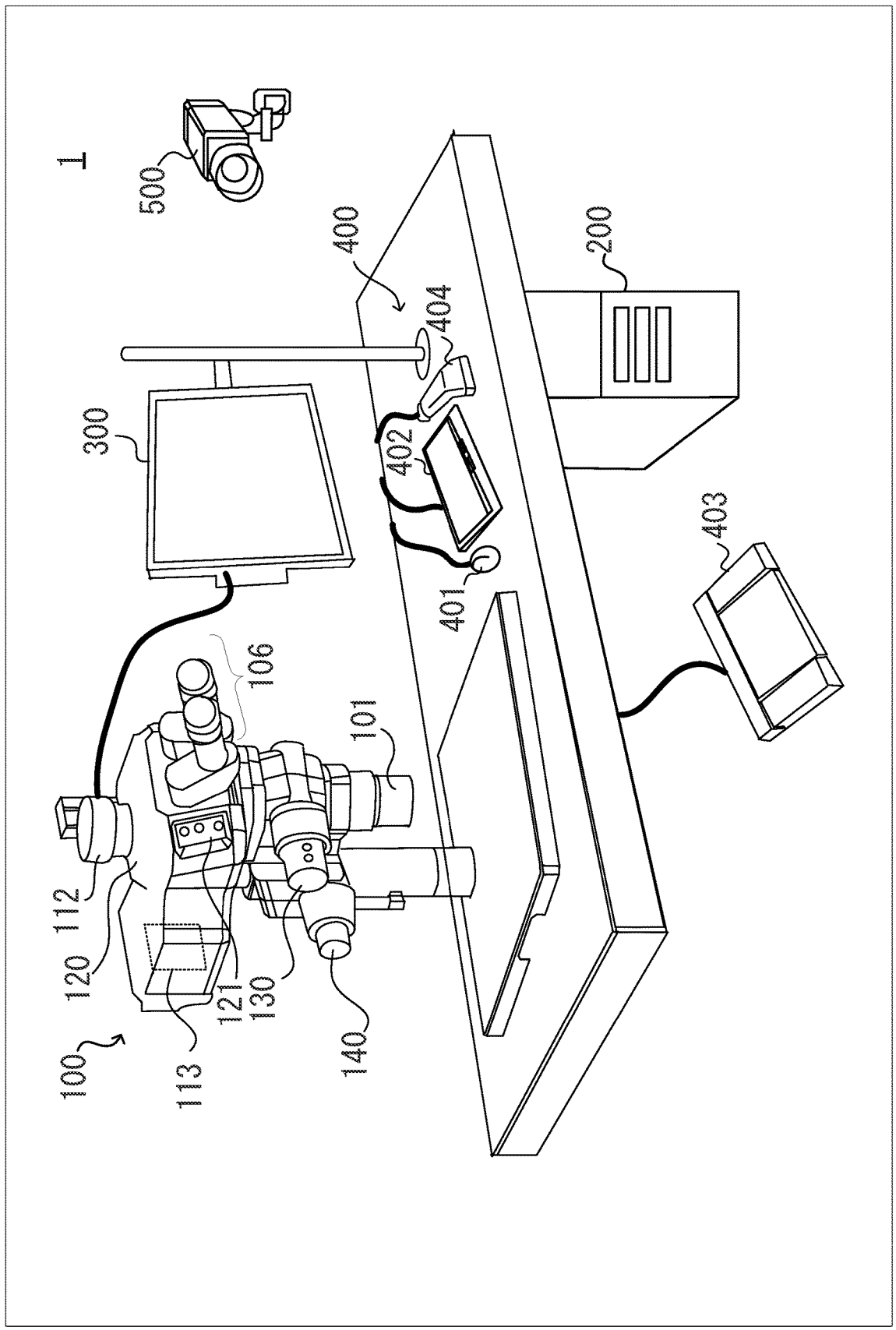
FIG. 1 is a diagram illustrating a microscope system according to an embodiment of the present invention.
Figure 2:
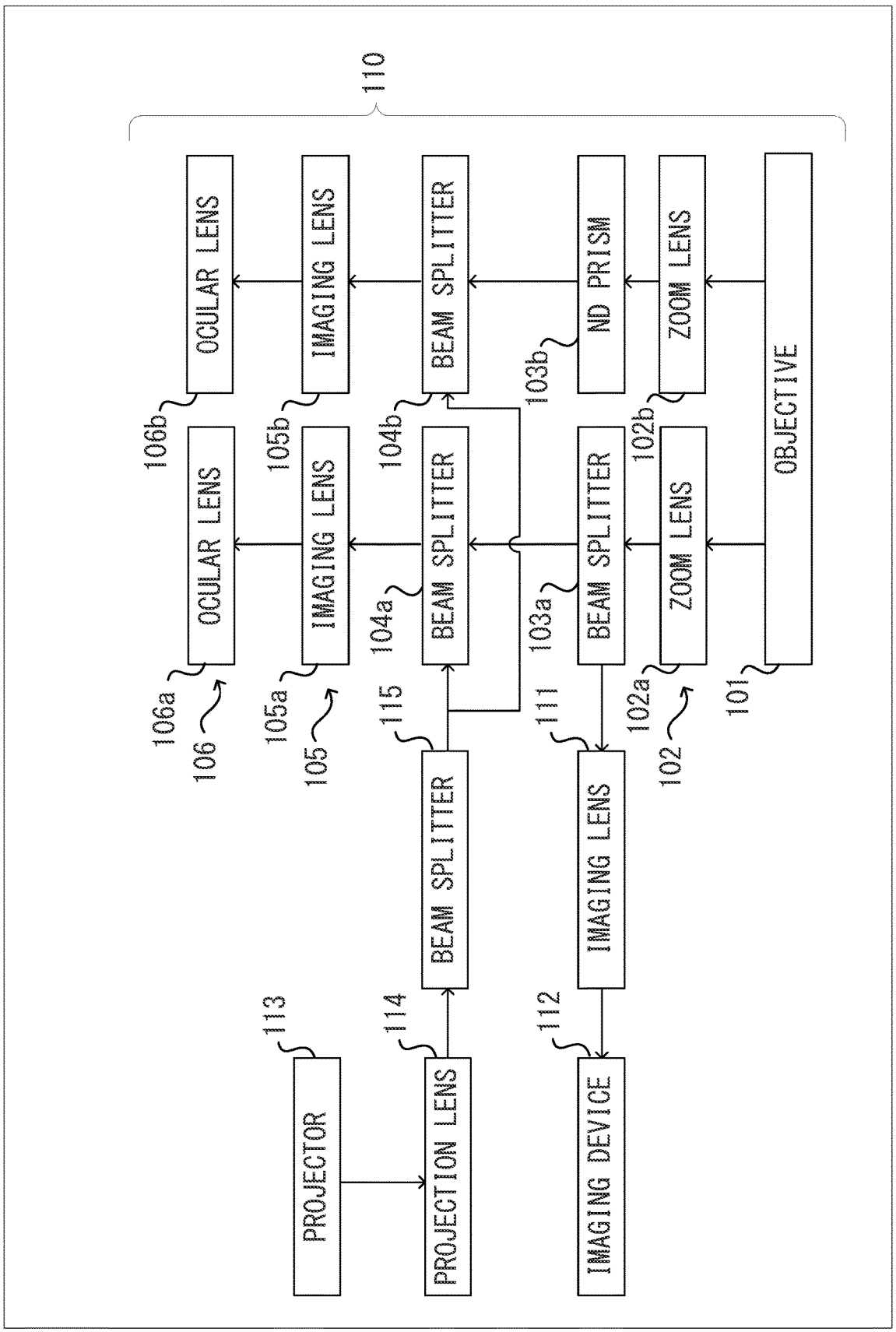
FIG. 2 is a diagram illustrating a configuration of an optical system included in the microscope system.
Figure 3:
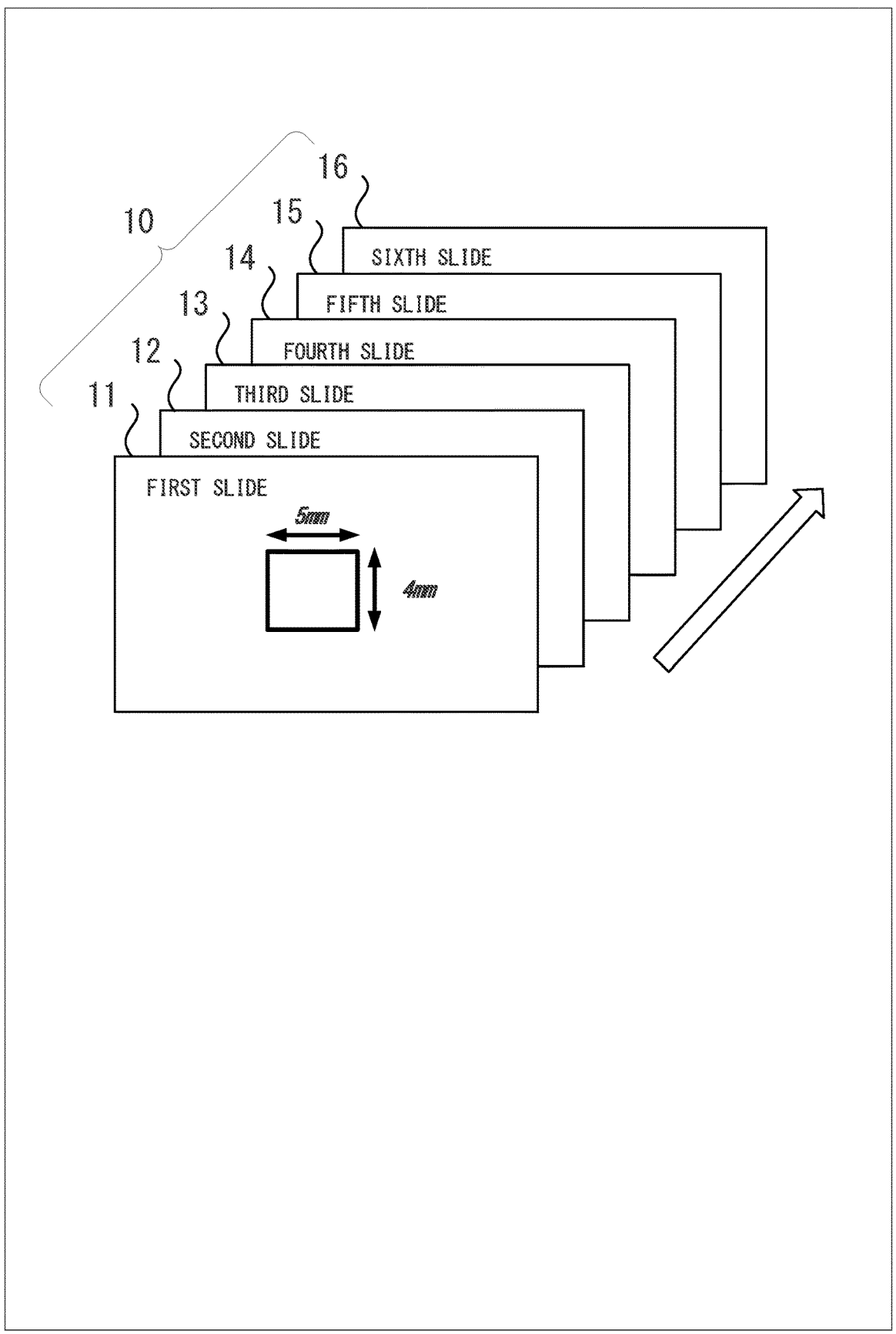
FIG. 3 is a diagram illustrating a configuration of a slide set.

FIG. 1 is a diagram illustrating a microscope system according to an embodiment of the present invention. FIG. 2 is a diagram illustrating a configuration of an optical system included in the microscope system. FIG. 3 is a diagram illustrating a configuration of a slide set. The microscope system 1 illustrated in FIG. 1 uses a slide set prepared in advance to provide a user with appropriate information at a necessary timing while the user works under a microscope 100 while looking into an ocular lens 106. A configuration of the microscope system 1 will be described with reference to FIGS. 1 to 3.

The microscope system 1 includes the microscope 100, a control device 200, a monitor 300, a plurality of input devices 400 (mouse 401, keyboard 402, foot switch 403, barcode reader 404), and a web camera 500.

The microscope 100 is a stereoscopic microscope that allows the user to stereoscopically view a sample, and includes a microscope optical system 110 illustrated in FIG. 2. The microscope optical system 110 is an optical system for a stereoscopic microscope. The user can observe an optical image formed on the object side of the ocular lens 106 (ocular lens 106a, ocular lens 106b) by the microscope optical system 110 with the left and right eyes via the ocular lens 106, and can stereoscopically observe the sample. Therefore, the microscope 100 is suitable for applications such as the assembly work of precision equipment, for example.

The microscope 100 includes a zoom lens 102 (zoom lens 102a, zoom lens 102b) operable with a zoom handle 130. By operating the zoom handle 130, it is possible to change the observation magnification while looking into the ocular lens 106 to continuously observe the sample.

The microscope 100 includes a focusing handle 140. By operating the focusing handle 140, it is possible to change the distance between the sample and an objective 101 to focus on the sample.

The microscope 100 includes an imaging device 112 that images the sample to acquire a digital image of the sample. An ocular tube 120 to which the ocular lens 106 is attached is a trinocular tube, and the imaging device 112 is attached to the ocular tube 120. The imaging device 112 is provided with a two-dimensional image sensor. The image sensor is not particularly limited, and is, for example, a CCD image sensor, a CMOS image sensor, or the like. The digital image acquired by the imaging device 112 is output to the control device 200. Furthermore, the digital image may be directly output to the monitor 300.

As illustrated in FIG. 2, light propagating from one of left and right optical paths of the microscope optical system 110 and branched by a beam splitter 103a such as a half mirror enters the imaging device 112 via an imaging lens 111. In order to compensate for the optical path lengths of the left and right optical paths generated by the beam splitter 103a and to suppress the difference between light amounts, an ND prism 103b is provided in the other optical path.

The microscope 100 includes a projector 113 that projects an auxiliary image on an image plane on which an imaging lens 105 (imaging lens 105a, imaging lens 105b) forms an optical image. The projector 113 is a device that projects and superimposes the auxiliary image on the image plane in accordance with a command from the control device 200. More specifically, the projector 113 superimposes the auxiliary image on the image plane based on auxiliary image data to be described later. Note that the type of the projector 113 is not particularly limited. The projector 113 may be configured with, for example, a liquid crystal device or a digital mirror device.

The projector 113 is provided in the ocular tube 120. Light from the projector 113 is guided to the left and right optical paths of the microscope optical system 110 via a projection lens 114 and a plurality of beam splitters (beam splitter 115, beam splitter 104a, and beam splitter 104b).

As illustrated in FIG. 1, the ocular tube 120 is provided with an operation unit 121. The user can switch on and off the projector 113 by operating the operation unit 121, and can instruct to start or stop the superimposition of the auxiliary image on the image plane.

The control device 200 controls the microscope 100. The control device 200 generates the auxiliary image data described above and outputs the auxiliary image data to the microscope 100 (projector 113). The auxiliary image data is generated using a slide set 10 stored in advance in the control device 200 as illustrated in FIG. 3.

The slide set 10 includes a plurality of slides (slide 11, slide 12, slide 13, slide 14, slide 15, slide 16). The slide set 10 is, for example, information for supporting assembly of precision equipment, and more specifically, may be a procedure manual for the assembly work. The plurality of slides are arranged in advance. That is, the slide set 10 includes the plurality of slides ordered in advance.

Each slide includes one or more pieces of content to be projected onto the image plane as an auxiliary image. Each of the plurality of slides is information on each process of assembling the precision equipment, and more specifically, may be information including the content of work, cautions, and the like in each process.

The control device 200 generates an auxiliary image based on information regarding a target slide selected from among the plurality of slides included in slide set 10. The auxiliary image includes the target slide. The control device 200 appropriately switches the target slide so that the microscope system 1 can switch the auxiliary image projected on the image plane so as to provide appropriate information to the user.

The monitor 300 and the input devices 400 are connected to the control device 200. The monitor 300 is, for example, a liquid crystal display, an organic EL display, or the like. The web camera 500 transmits a captured image to the control device 200 via a network such as the Internet. The web camera 500 images, for example, a user who uses the microscope system 1.

Figure 4:
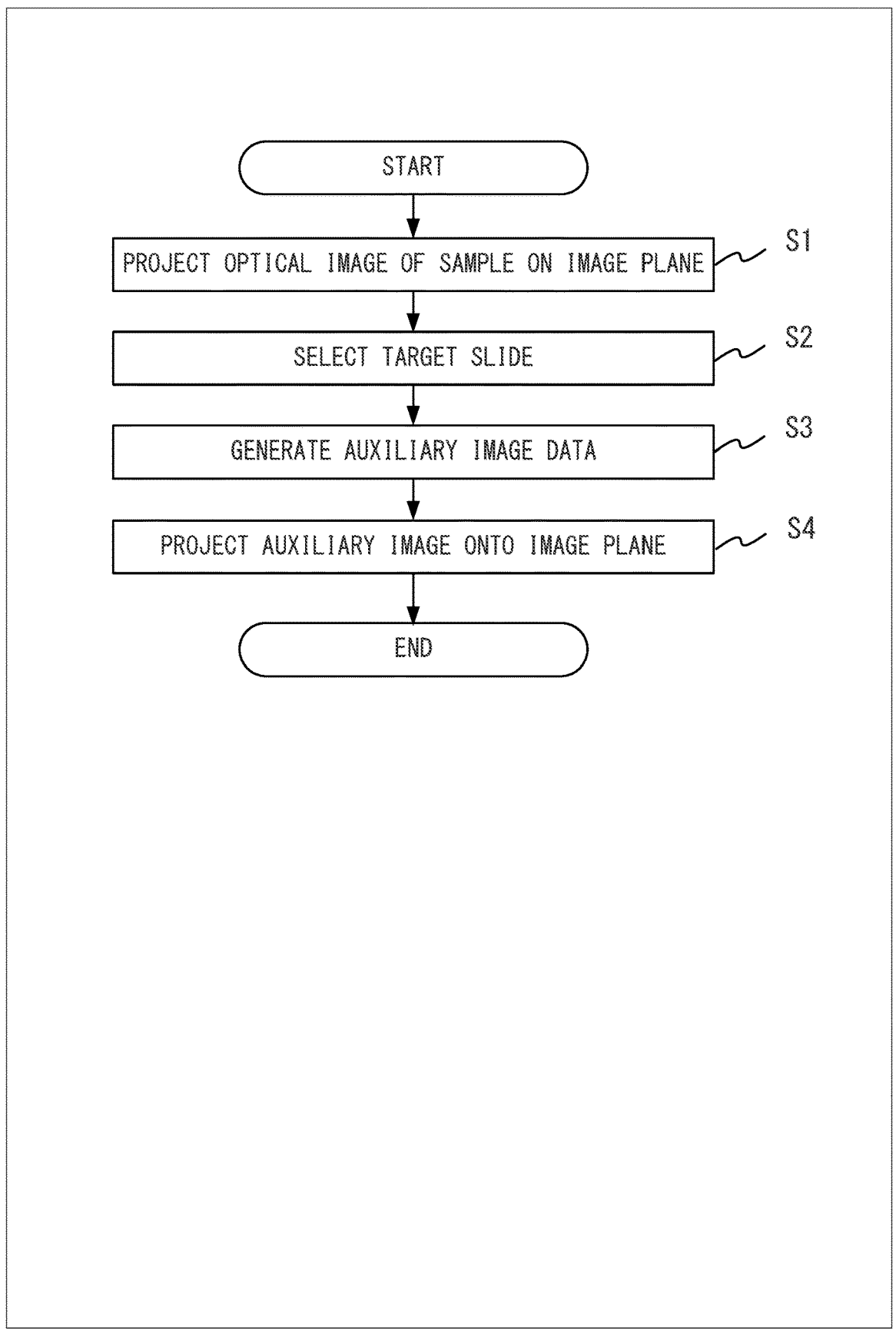
FIG. 4 is an example of a flowchart of an image projection process to be performed by the microscope system.
Figure 5:
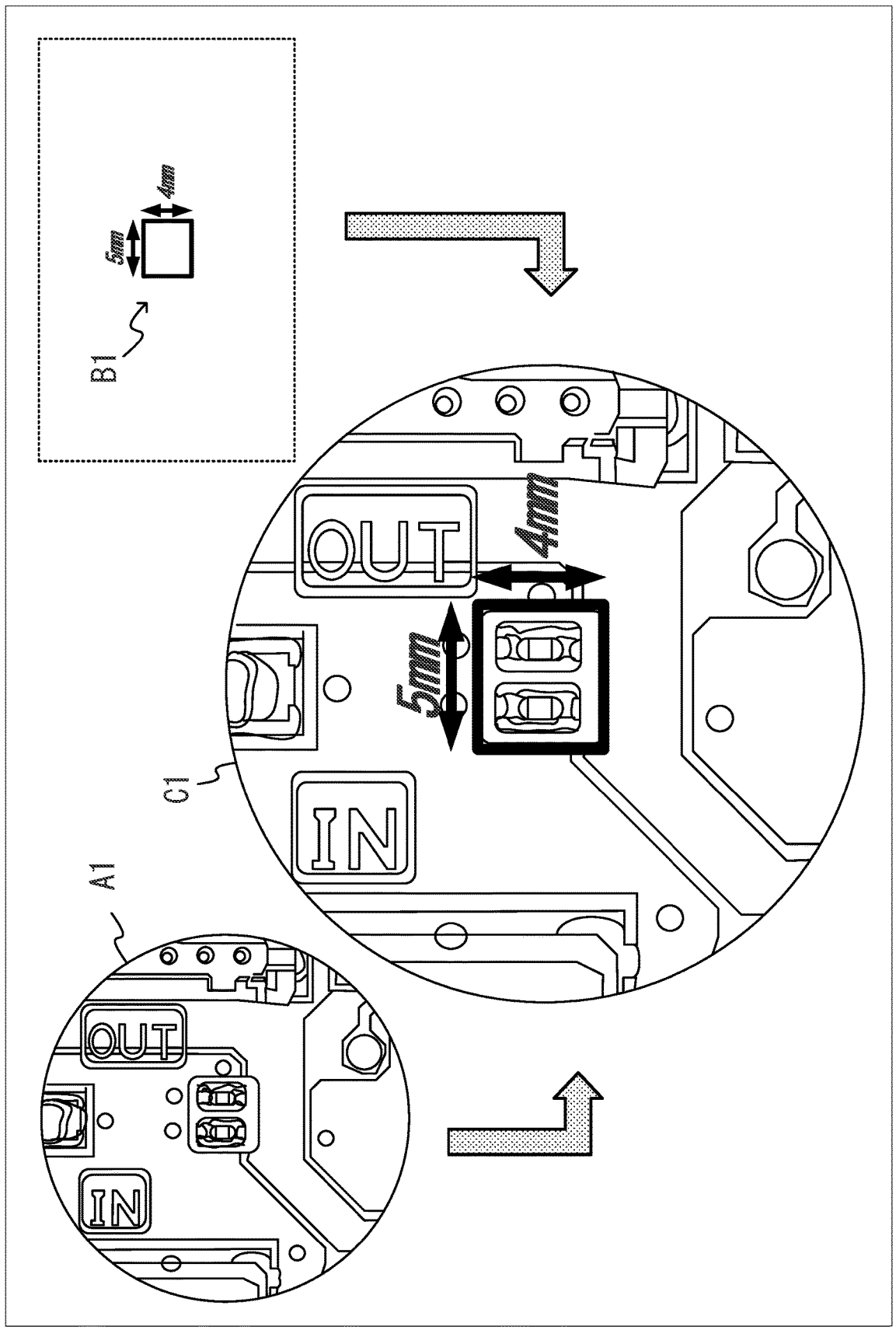
FIG. 5 is a diagram for describing a configuration of an image formed on an image plane.

The microscope system 1 having such a configuration as described above performs an image projection process illustrated in FIG. 4. FIG. 4 is an example of a flowchart of the image projection process to be performed by the microscope system. FIG. 5 is a diagram for describing a configuration of an image formed on the image plane. The image projection process performed by the microscope system 1 will be described below with reference to FIGS. 4 and 5.

First, the microscope system 1 projects an optical image of the sample onto the image plane (step S1). Here, the imaging lens 105 focuses light from the sample captured by the objective 101 onto the image plane to form an optical image of the sample. As a result, for example, an optical image A1 in FIG. 5 is projected on the image plane.

Next, the microscope system 1 selects a target slide (step S2). Here, the control device 200 selects the target slide from the slide set 10. As long as it is immediately after the start of the image projection process illustrated in FIG. 4, the control device 200 may select, for example, the first slide 11 from among the plurality of ordered slides included in slide set 10 as the target slide. When detecting an instruction to switch the target slide, the control device 200 may select the next slide (for example, the slide 12) as a new target slide in a case where the instruction is an instruction to switch to the next slide, and may select the previous slide (for example, the slide 16) as the new target slide in a case where the instruction is an instruction to switch to the previous slide. That is, the control device 200 selects the slide determined according to the order in which the plurality of slides are ordered as the new target slide in response to the instruction to switch the target slide.

For example, the user may input the instruction to switch the target slide to the control device 200 using any one or more of the input devices. In addition, the instruction to switch the target slide may be generated by the control device 200 itself, for example.

For example, the control device 200 may generate the switching instruction based on an elapsed time measured by a timer. Furthermore, the control device 200 may generate the switching instruction based on an analysis result of an image captured by the imaging device 112. In this case, the control device 200 may select the slide determined according to the analysis result of the image captured by the imaging device 112 as the new target slide. Furthermore, the control device 200 may generate the switching instruction based on, for example, a gesture of the user recognized via the web camera 500.

When the target slide is selected, the microscope system 1 generates auxiliary image data (step S3). Here, the control device 200 generates the auxiliary image data based on information regarding the target slide selected in step S2. For example, when the slide 11 illustrated in FIG. 3 is selected as the target slide, the control device 200 generates auxiliary image data corresponding to an auxiliary image B1 illustrated in FIG. 5 and including the target slide (slide 11) based on information such as the type (rectangular gauge) of the content included in the target slide, the size (width and height) of the content, the position (coordinates) of the content, and other options (presence or absence of dimension display).

Finally, the microscope system 1 projects the auxiliary image onto the image plane (step S4). Here, the control device 200 outputs the auxiliary image data generated in step S3 to the microscope 100, and the projector 113 of the microscope 100 projects the auxiliary image B1 onto the image plane based on the auxiliary image data output from the control device 200. Consequently, as illustrated in FIG. 5, the auxiliary image B1 is superimposed on the image plane on which the optical image A1 is formed, and a superimposed image C1 in which the auxiliary image B1 is superimposed on the optical image A1 is formed.

As described above, in the microscope system 1, the slide selected from the slide set prepared in advance is projected as the auxiliary image on the image plane on which the optical image is formed. Further, the slide projected on the image plane is switched according to a predetermined order according to the switching instruction. For this reason, even in the case of performing work such as the assembly work in which necessary information differs for each process, the user can obtain the information corresponding to the work process while observing the optical image of the sample without releasing the eyes from the ocular lens 106 by switching the slide. As a result, it is possible to perform a series of work such as the assembly work without frequently moving the line of sight between the ocular lens 106 and the monitor 300. Therefore, according to the microscope system 1, the efficiency of the user's work performed under the microscope can be greatly improved.

Figure 6:
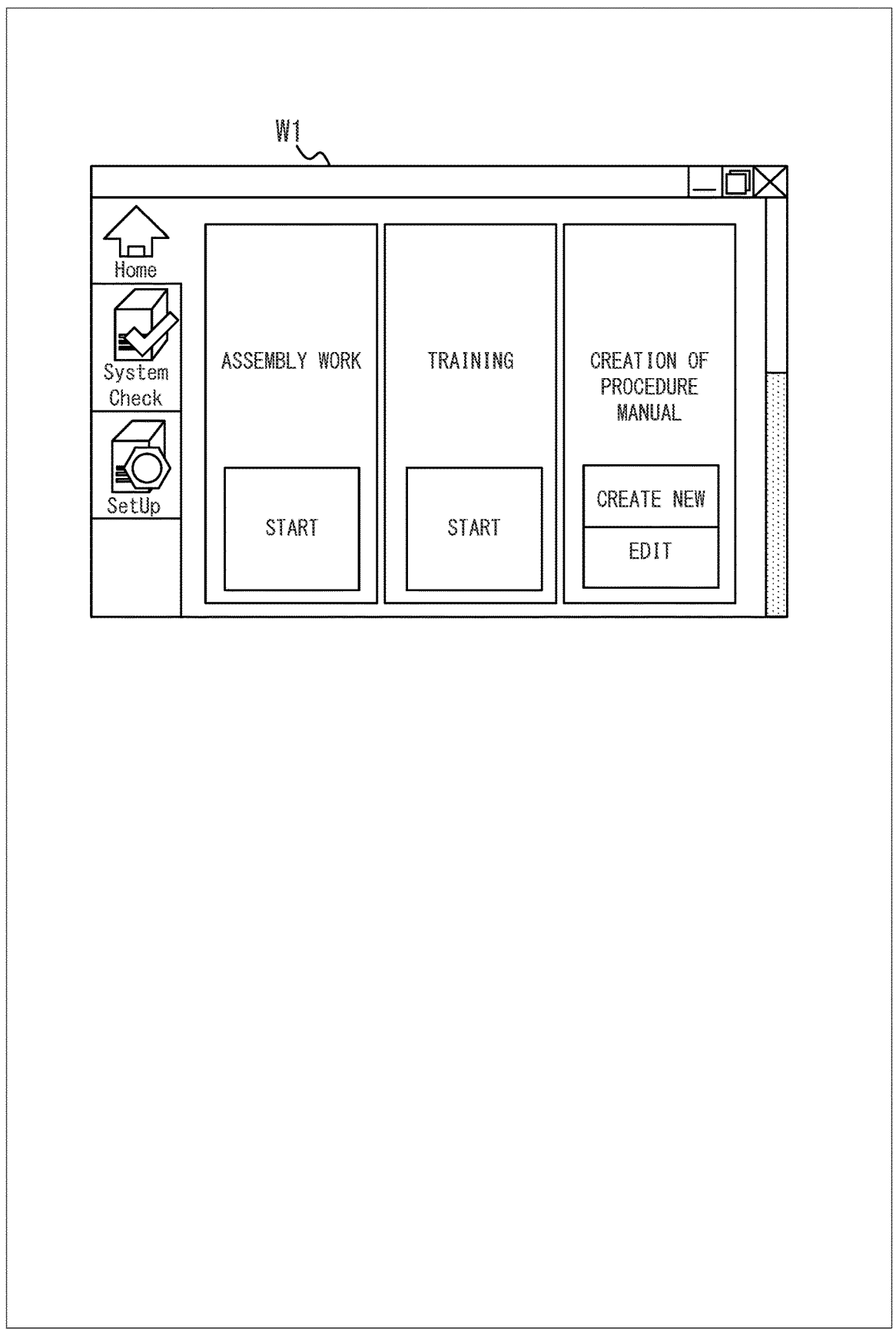
FIG. 6 is a diagram illustrating an example of a home screen displayed on a monitor.

Functions of a software application (hereinafter referred to as a work support application) that is provided by the microscope system 1 and supports assembly work performed under the microscope will be described below more specifically. FIG. 6 is a diagram illustrating an example of a home screen displayed on the monitor. In the microscope system 1, when the control device 200 executes a predetermined program, the work support application is started, and a window W1 illustrated in FIG. 6 is displayed on the monitor 300.

Immediately after the work support application is started, the home screen illustrated in FIG. 6 is displayed in the window W1 in a state where a home tab is selected. From the home screen, the user can select a work mode for supporting the assembly work, a training mode for receiving instruction from a trainer, and a procedure manual mode for creating a procedure manual to be used in the assembly work.

Furthermore, various settings can be adjusted by selecting a setup tab. Various settings for appropriately operating the work support application will be described below with reference to FIGS. 7 to 10.

Figure 7:
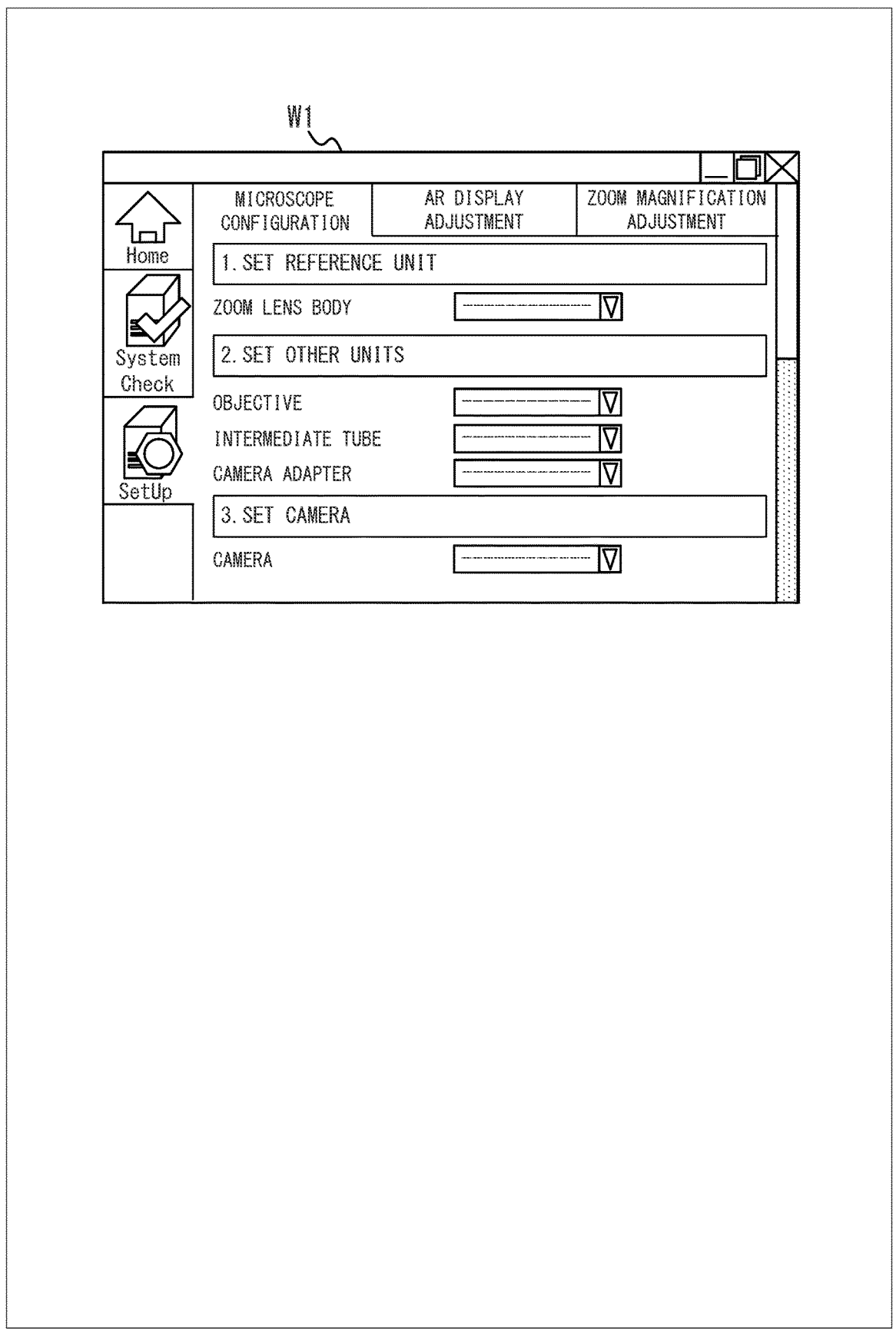
FIG. 7 is a diagram illustrating an example of a screen for setting a microscope configuration.
Figure 8:
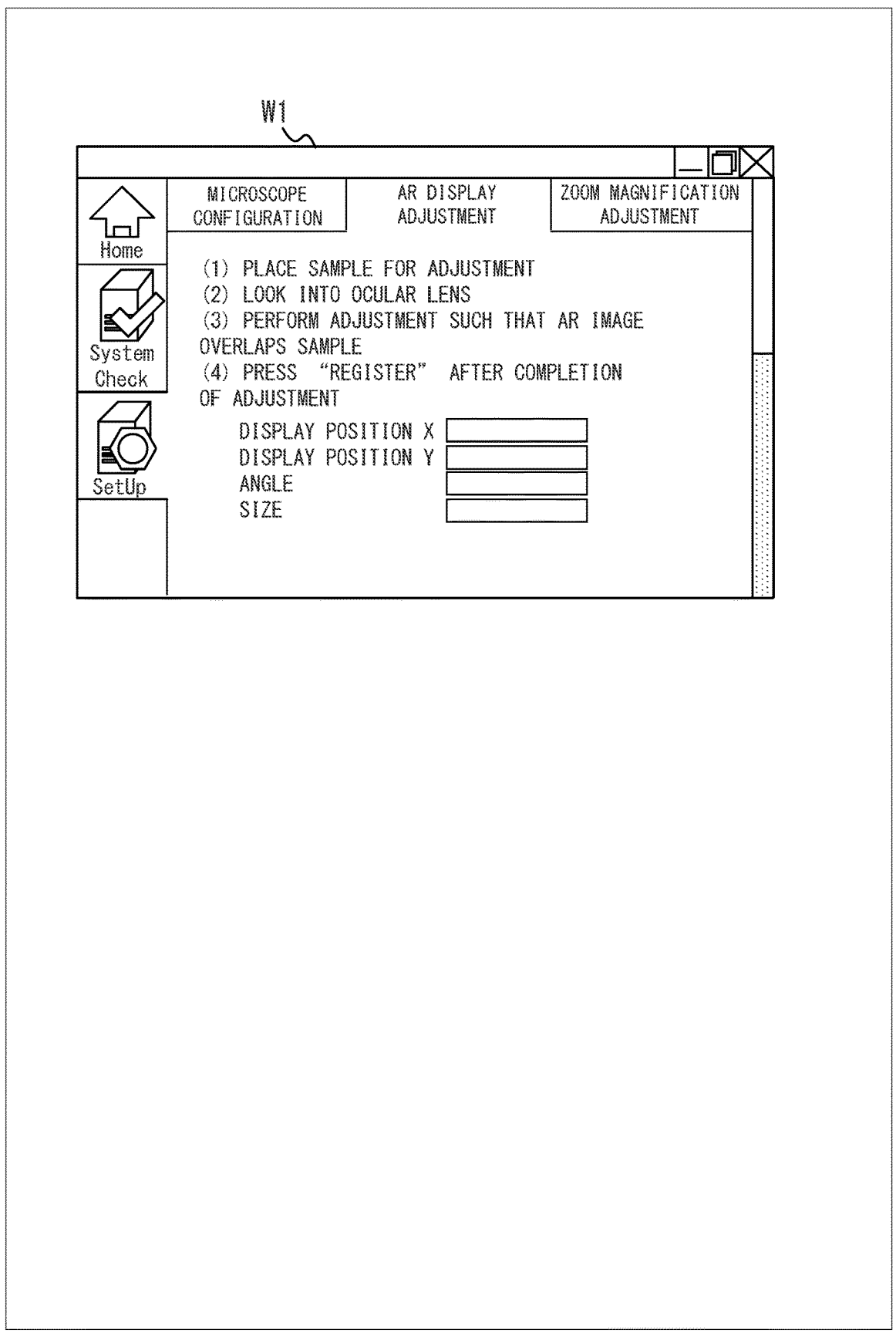
FIG. 8 is a diagram illustrating an example of a screen for adjusting AR display.
Figure 9:
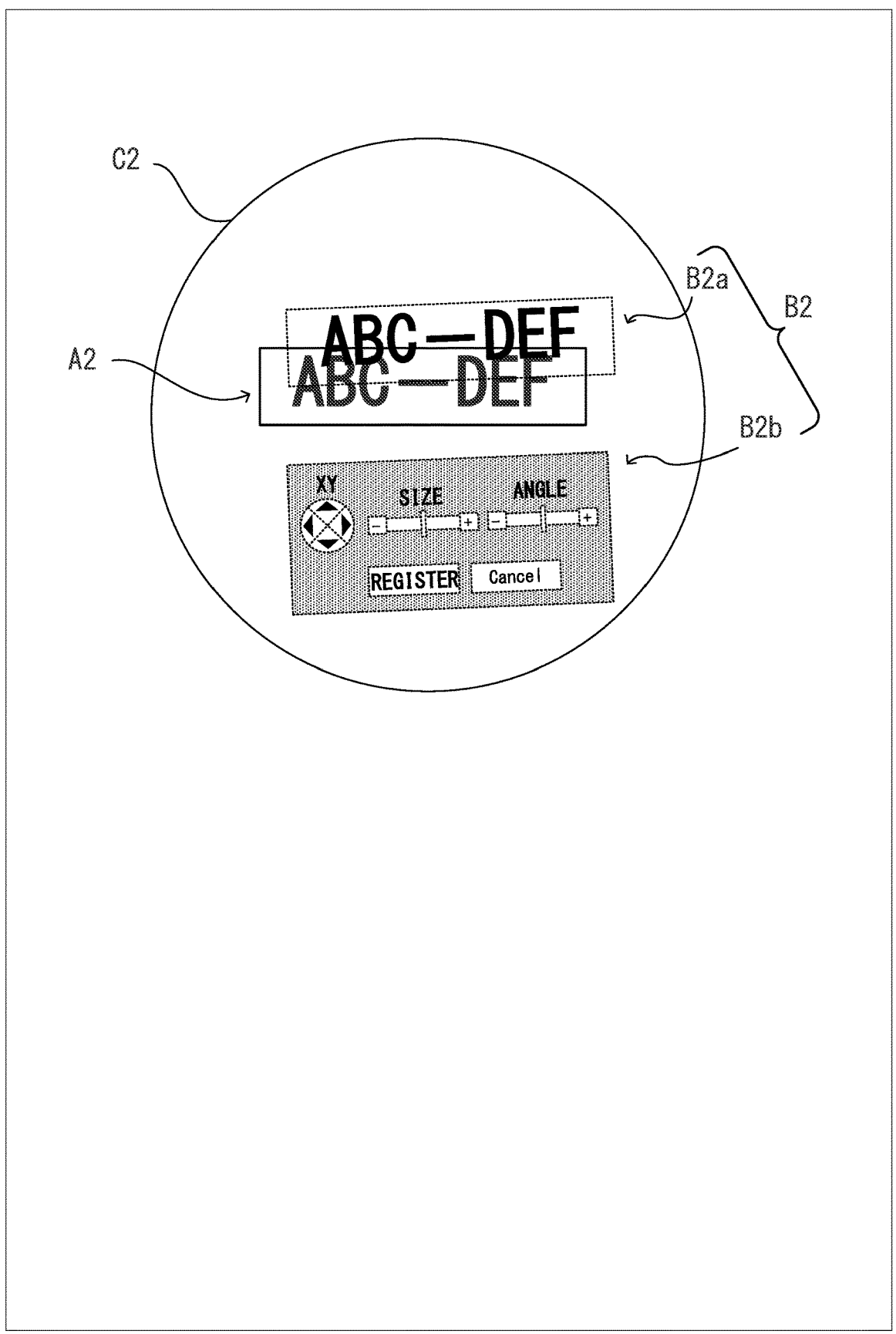
FIG. 9 is a diagram for describing a method of adjusting the AR display.
Figure 10:
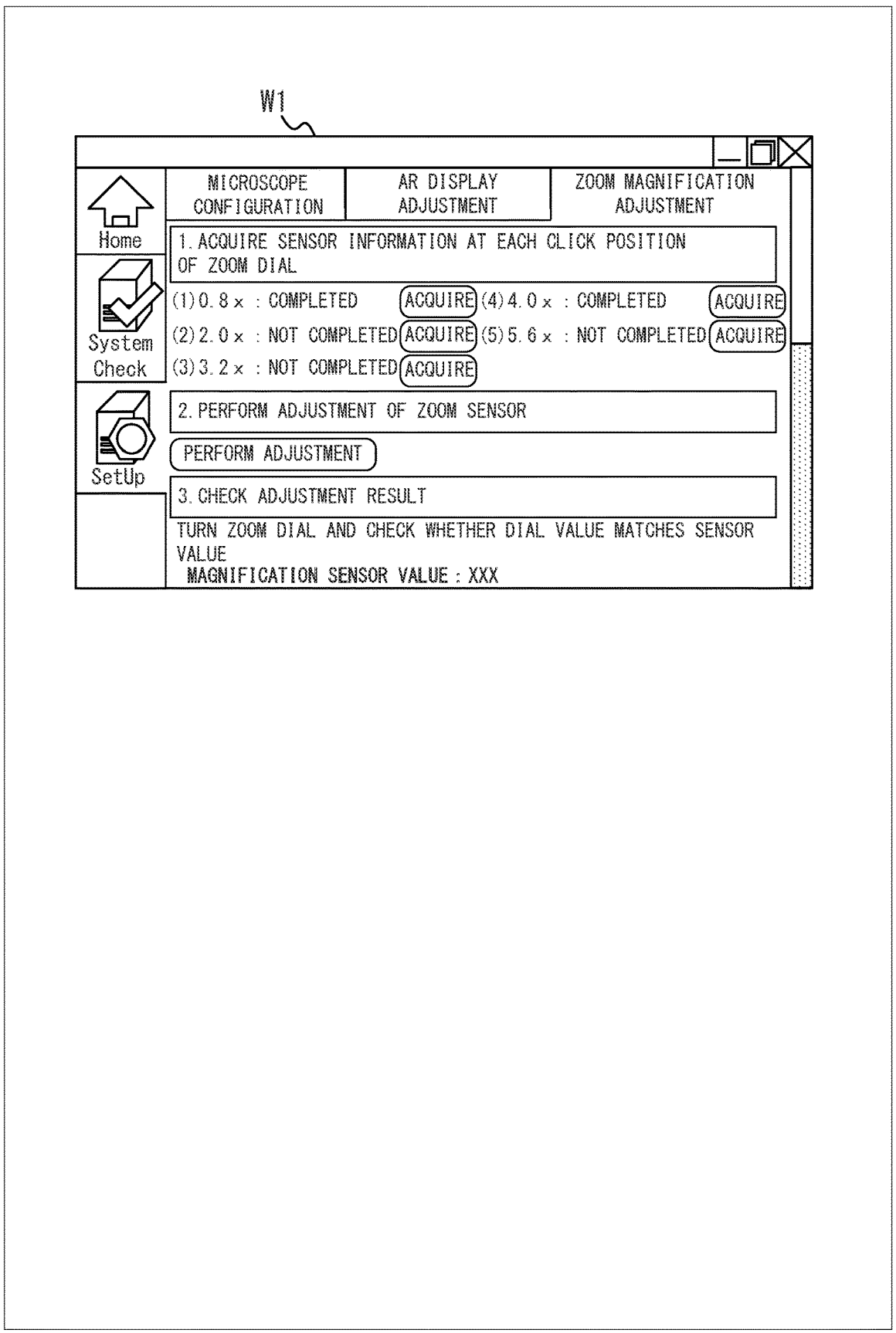
FIG. 10 is a diagram illustrating an example of a screen for adjusting a zoom sensor.

FIG. 7 is a diagram illustrating an example of a screen for setting a microscope configuration. FIG. 8 is a diagram illustrating an example of a screen for adjusting AR display. FIG. 9 is a diagram for describing a method of adjusting the AR display. FIG. 10 is a diagram illustrating an example of a screen for adjusting a zoom sensor.

When a microscope configuration tab in the setup tab is selected, the screen illustrated in FIG. 7 is displayed. The user can cause the control device 200 to correctly recognize the configuration of the microscope 100 by selecting each of the zoom lens body, the objective, an intermediate tube, a camera adapter, and the camera from a pull-down list based on the configuration of the microscope 100 according to a procedure displayed on the screen illustrated in FIG. 7. As a result, the control device 200 can also recognize, for example, magnification (magnification excluding zoom magnification) serving as a reference of the microscope optical system 110.

When an AR display adjustment tab in the setup tab is selected, the screen illustrated in FIG. 8 is displayed. By adjusting AR display according to a procedure displayed on the screen illustrated in FIG. 8, the user can match a position on the digital image acquired by the imaging device 112 with the position of the AR display. As a result, the AR, that is, each piece of content of the slide included in the auxiliary image can be correctly displayed at the position recognized by the control device 200 via the digital image.

Note that a specific procedure of the AR display adjustment is as follows. First, the user (1) places a sample for adjustment on a stage, and (2) looks into the ocular lens 106. During the AR display adjustment, an auxiliary image B2 including a digital image acquired by the imaging device 112 is projected on the image plane by the projector 113. Therefore, the user can check a superimposed image C2 as illustrated in FIG. 9 through the ocular lens 106. The superimposed image C2 is an image on which the auxiliary image B2 is superimposed on an optical image A2 of the sample for adjustment. The auxiliary image B2 includes a digital image (content B2a) of the sample for adjustment and an adjustment menu (content B2b).

Thereafter, the user (3) performs adjustment so that the AR display overlaps the sample for adjustment. Specifically, by operating the adjustment menu to adjust the projection position, angle, and size of the digital image, the digital image of the sample and the optical image of the sample are exactly matched on the image plane. When the adjustment is successfully completed, the user (4) presses a registration button. As a result, setting information for appropriately projecting the auxiliary image onto the image plane is recorded in the control device 200 based on the information of the display position (X, Y), the angle, and the size after the adjustment. Specifically, this setting information is a conversion formula for converting the pixel position of the imaging device 112 into the pixel position of the projector 113. This conversion formula is calculated from the information of the display position, angle, and size after the adjustment described above. In FIGS. 8 and 9, the example including the above three elements has been described, but the conversion formula may include at least one or more of elements, a size (scaling), rotation, translation, and a distortion coefficient.

When a zoom sensor adjustment tab in the setup tab is selected, the screen illustrated in FIG. 10 is displayed. The user can cause the control device 200 to correctly recognize the setting of the zoom lens 102 by adjusting the zoom sensor according to a procedure displayed on the screen illustrated in FIG. 10. As a result, since the control device 200 can correctly recognize the zoom magnification changed by operating the zoom handle 130 via the zoom sensor, the current magnification of the microscope optical system 110 can be correctly recognized from the reference magnification and the zoom magnification of the microscope optical system 110.

Note that a specific procedure of the zoom sensor adjustment is as follows. The user (1) adjusts a zoom dial to each click position (0.8×, 2.0×, 3.2×, 4.0×, 5.6×) by operating the zoom handle 130, and then presses an acquisition button. As a result, the control device 200 acquires sensor information generated at each magnification from the zoom sensor. Next, the user (2) instructs the execution of the adjustment. Here, the control device 200 updates information indicating the relationship between the sensor information output from the zoom sensor and the zoom magnification based on the sensor information acquired in (1) and information of the zoom magnification corresponding to the sensor information. Finally, the user (3) checks the adjustment result. Here, the user turns the zoom dial to an arbitrary position to check whether the zoom magnification indicated by the dial matches a magnification sensor value displayed on the screen.

Figure 11:
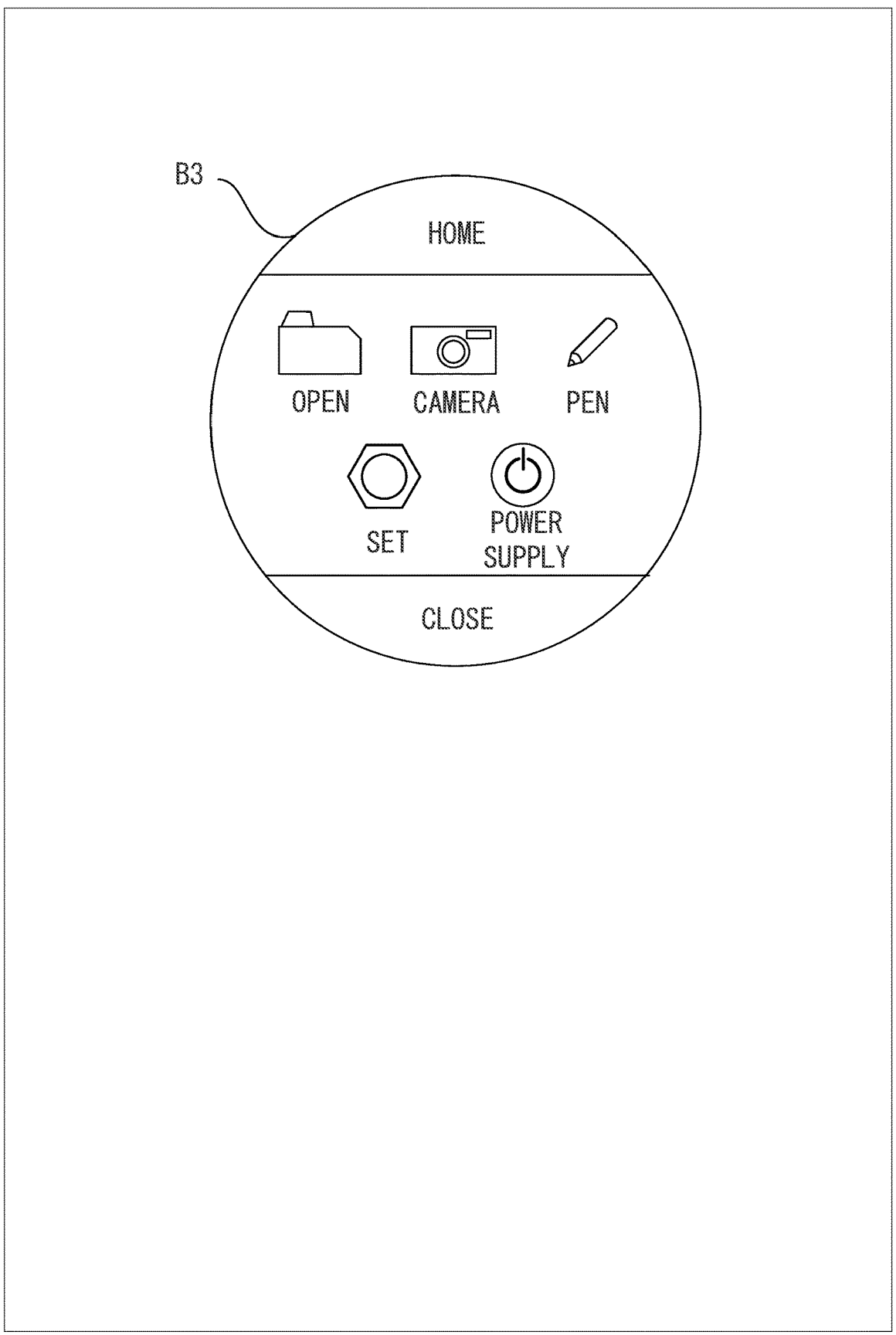
FIG. 11 is a diagram illustrating an example of a home screen observed from an ocular lens.
Figure 12:
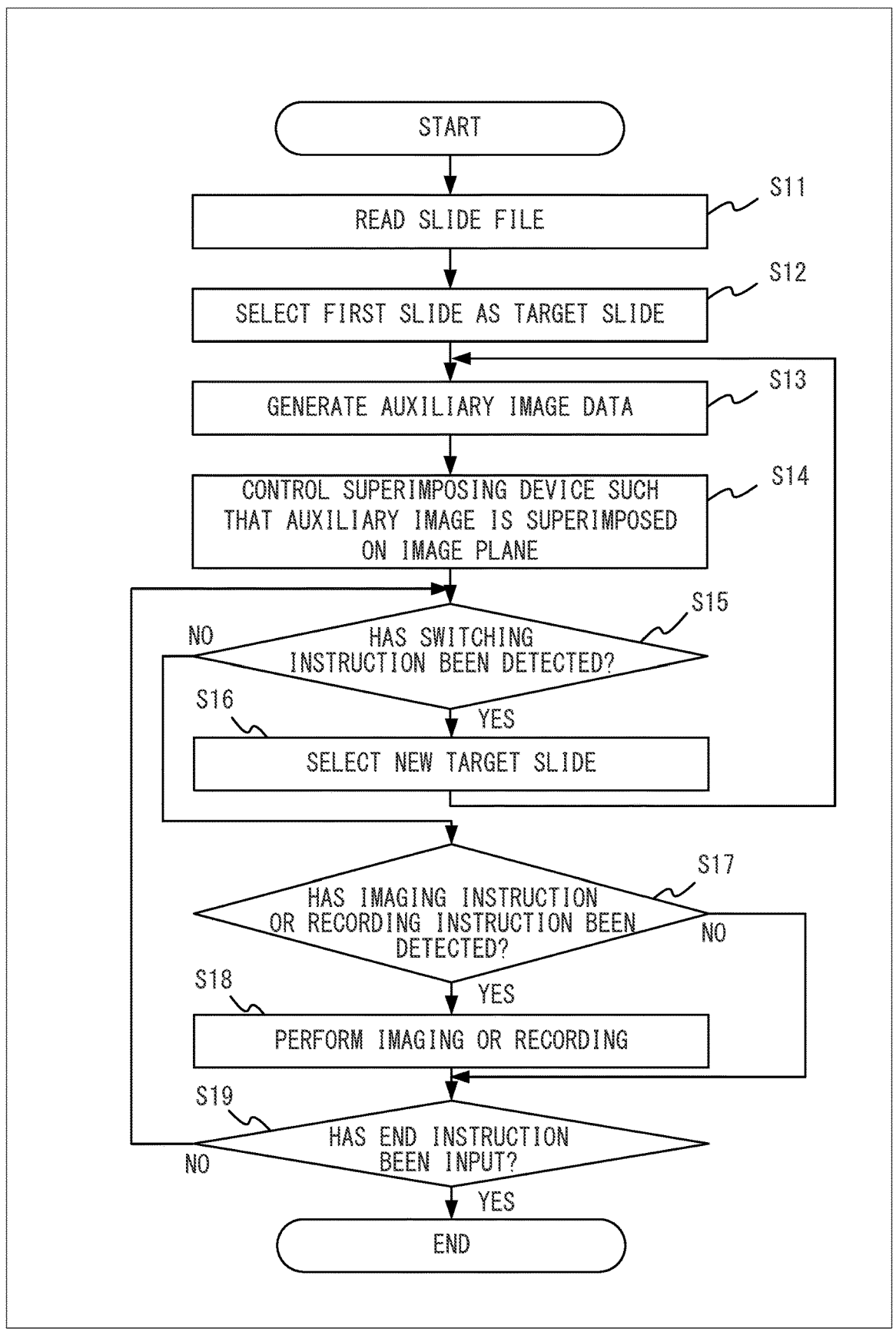
FIG. 12 is an example of a flowchart of an assembly work support process.

Next, the work mode of the work support application will be described. FIG. 11 is a diagram illustrating an example of the home screen observed from the ocular lens. FIG. 12 is an example of a flowchart of an assembly work support process.

The work mode is started when the user presses an assembly work start button on the home screen displayed on the monitor 300 as illustrated in FIG. 6. In addition, when the user performs a predetermined operation (for example, pressing an allocation key) using any one or more of the input devices 400, the projector 113 projects an auxiliary image B3 illustrated in FIG. 11 on the image plane, and a menu screen is displayed in the field of view. The work mode may be started when the user selects "Open" on the menu screen (auxiliary image B3) observed through the ocular lens 106. When the work mode is started, the control device 200 starts the assembly work support process illustrated in FIG. 12.

First, the control device 200 reads a slide file (step S11). More specifically, the control device 200 reads the slide file selected by the user using any one or more of the input devices 400. The slide file is a file in which information of the slide set is recorded, and is created and edited in the procedure manual mode described later.

The slide file is typically selected by the user clicking an icon of the slide file in the folder, but the selection method is not limited to this method. For example, the barcode reader 404 may acquire identification information (for example, the path of the slide file) of the slide set from a barcode, and the control device 200 may read the slide file based on the identification information acquired by the barcode reader 404 to acquire the slide set. That is, the barcode reader 404 is an example of an acquisition device that acquires the identification information of the slide set, and the control device 200 may acquire the slide set based on the identification information acquired by the acquisition device.

The acquisition device that acquires the identification information of the slide set is not limited to a one-dimensional code reader such as the barcode reader 404, and may be a two-dimensional code reader such as a QR code reader (QR code is a registered trademark) or an RF tag reader. Furthermore, for example, the acquisition device may detect a two-dimensional code from the digital image acquired by the imaging device 112 to acquire the identification information. That is, the acquisition device may include at least one of a one-dimensional code reader, a two-dimensional code reader, an RF tag reader, and an imaging device.

When the slide file is read, control device 200 selects the first slide as the target slide (step S12). More specifically, the control device 200 selects the first slide as the target slide from among the plurality of ordered slides included in the slide set corresponding to the slide file selected in step S1.

Next, the control device 200 generates auxiliary image data (step S13). More specifically, the control device 200 generates the auxiliary image data based on information regarding the target slide (the first slide) selected in step S12.

In a case where the size of the auxiliary image projected on the image plane is changed according to the observation magnification, the control device 200 may generate the auxiliary image data based on the information regarding the target slide and the magnification information of the microscope optical system 110. Since the above-described adjustment of the zoom sensor is performed in advance, the control device 200 can easily acquire accurate magnification information regarding the microscope optical system 110.

Figure 13:
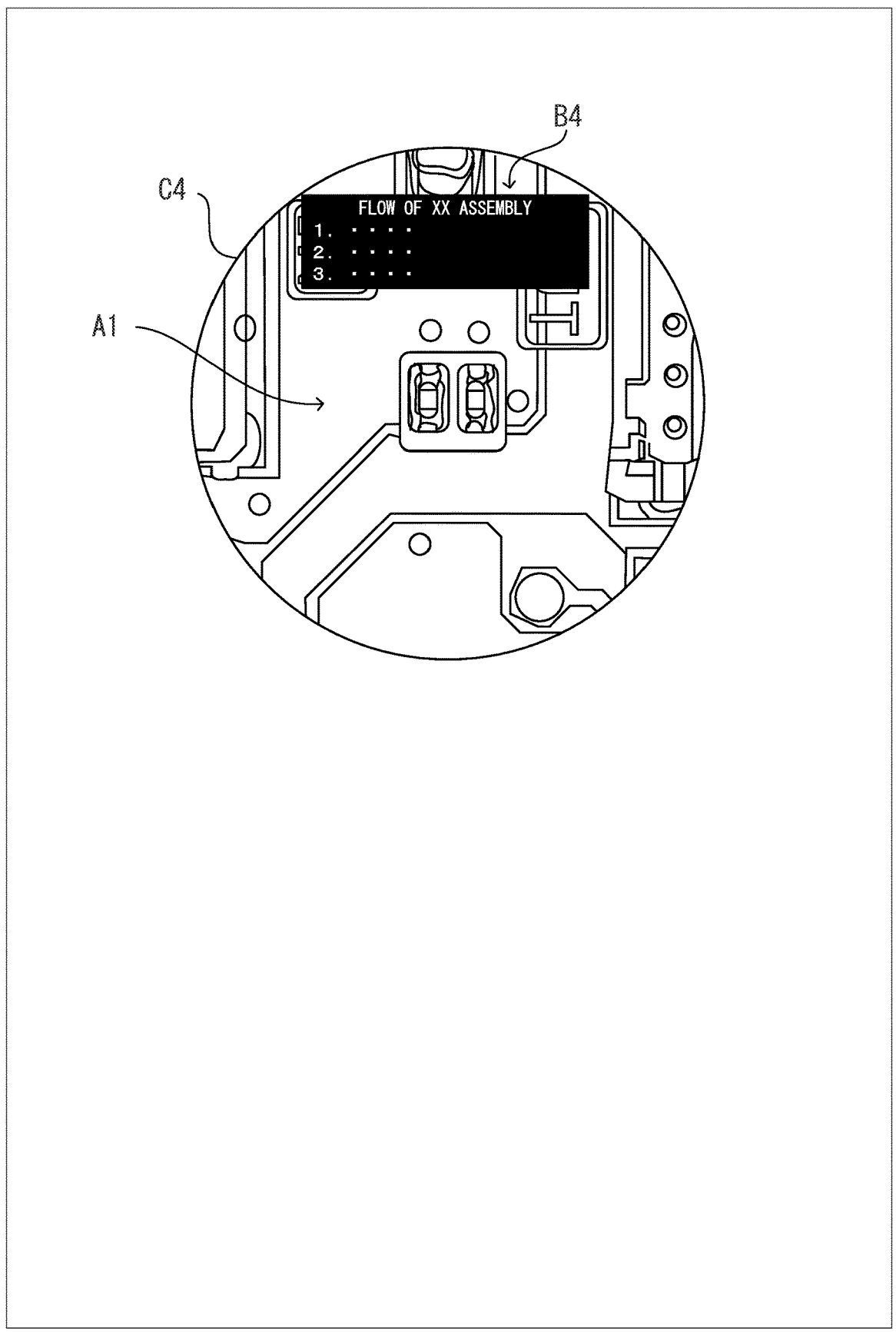
FIG. 13 is a diagram illustrating an example of a superimposed image observed from the ocular lens.

When the auxiliary image data is generated, the control device 200 controls the projector 113 as the superimposing device such that an auxiliary image is superimposed on the image plane (step S14). In a case where the whole flow of the assembly work is itemized in text in the first slide, for example, as illustrated in FIG. 13, a superimposed image C4 in which an auxiliary image B4 of text content is superimposed on the optical image A1 is formed on the image plane. As a result, the user can check at a glance the content of the work to be performed at the initial stage of the assembly work by using the auxiliary image B4 displayed in the field of view. Note that FIG. 13 is a diagram illustrating an example of a superimposed image observed from the ocular lens.

Figure 14:
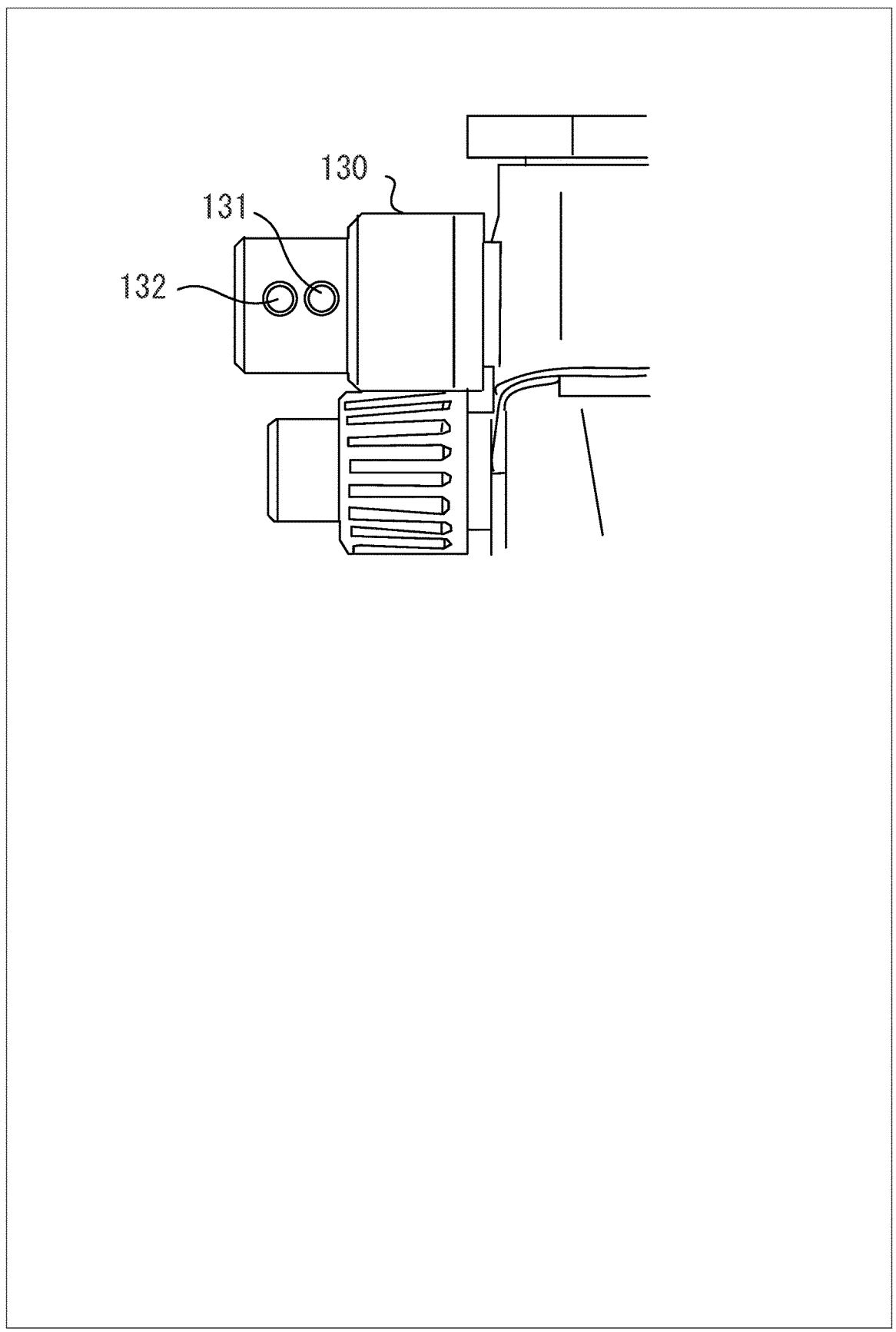
FIG. 14 is a diagram for describing a slide switching operation.

Thereafter, the control device 200 determines whether or not a switching instruction has been detected (step S15). For example, the user can input the switching instruction to the control device 200 using any one or more of the input devices 400. FIG. 14 is a diagram for describing a slide switching operation. For example, the switching instruction may be input to the control device 200 by pressing a switch (switch 131, switch 132) provided on the zoom handle 130 as illustrated in FIG. 14. An instruction to switch to the next slide may be input to the control device 200 by pressing the switch 131, and an instruction to switch to the previous slide may be input to the control device 200 by pressing the switch 132.

The switching instruction may be input to the control device 200 by the rotation of the wheel of the mouse 401. An instruction to switch to the next slide may be input to the control device 200 by rotating the wheel forward, and an instruction to switch to the previous slide may be input to the control device 200 by rotating the wheel backward. Alternatively, the switching instruction may be input to the control device 200 by pressing a shortcut key of the keyboard 402. Further, the switching instruction may be input to the control device 200 by pressing the foot switch 403. An instruction to switch to the next slide may be input to the control device 200 by stepping on the right region of the foot switch 403, and an instruction to switch to the previous slide may be input to the control device 200 by stepping on the left region of the foot switch 403. Further, the switching of the slide may be instructed by voice, and a microphone (not illustrated) may function as an input device that inputs the switching instruction. That is, the input device that inputs the switching instruction may include at least one of a mouse, a keyboard, a switch provided on a handle, a foot switch, and a microphone. It is desirable that the input device that inputs the switching instruction be able to instruct the switching by one simple operation that the user can perform while looking into the ocular lens 106.

When detecting the switching instruction (YES in step S15), the control device 200 selects a new target slide (step S16). Here, when detecting the instruction to switch to the next slide, the control device 200 selects the next slide of the current target slide as the target slide according to the order of the plurality of slides from a plurality of slide sets included in the slide set acquired in step S11. Similarly, when detecting the instruction to switch to the previous slide, the control device 200 selects the previous slide of the current target slide as the target slide according to the order of the plurality of slides from among the plurality of slide sets.

Figure 15:
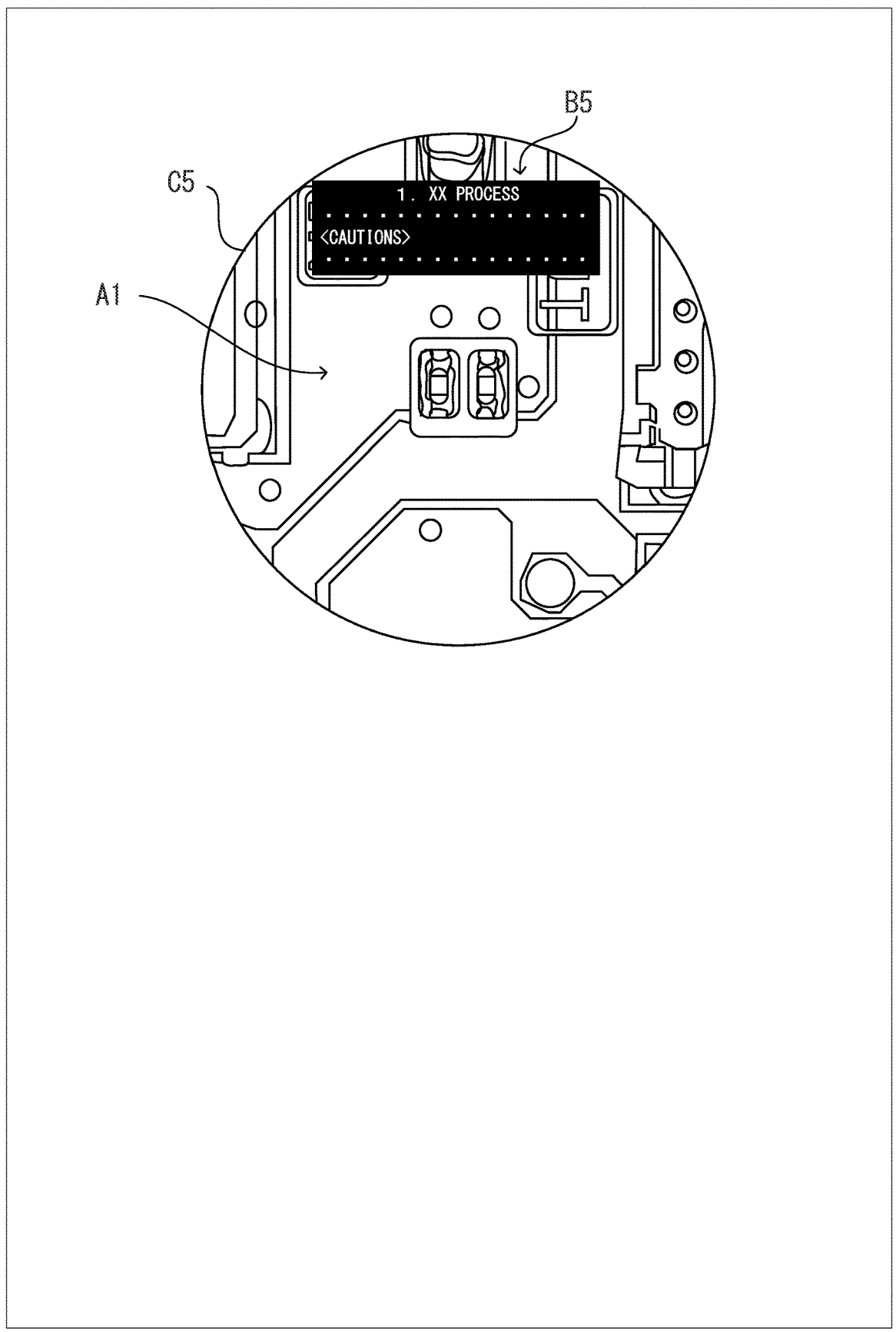
FIG. 15 is a diagram illustrating another example of the superimposed image observed from the ocular lens.

Thereafter, the control device 200 performs the processing of steps S13 and S14 again. In a case where the new target slide includes a text describing the cautions in the work in the process to be performed, for example, a superimposed image C5 in which an auxiliary image B5 including text content is superimposed on the optical image A1 as illustrated in FIG. 15 is formed on the image plane. As a result, it is possible to cause the user to check the cautions in the work immediately before the work, and thus, it is possible to expect an effect of reducing human errors caused in the work. Note that FIG. 15 is a diagram illustrating an example of a superimposed image observed from the ocular lens.

The control device 200 repeatedly performs the processing of steps S13 to S16 in response to the input of the switching instruction. As a result, for example, a plurality of slides included in a slide set are sequentially projected on the image plane, and information to be provided is provided to the user at a necessary timing. In addition, even in a case where the user redoes the work, the slide set is returned and appropriate information is provided to the user.

FIGS. 16 to 28 are diagrams illustrating other examples of the superimposed image observed from the ocular lens. With reference to FIGS. 16 to 28, an example of the assembly work performed by the user while switching the slides will be described below.

Figure 16:
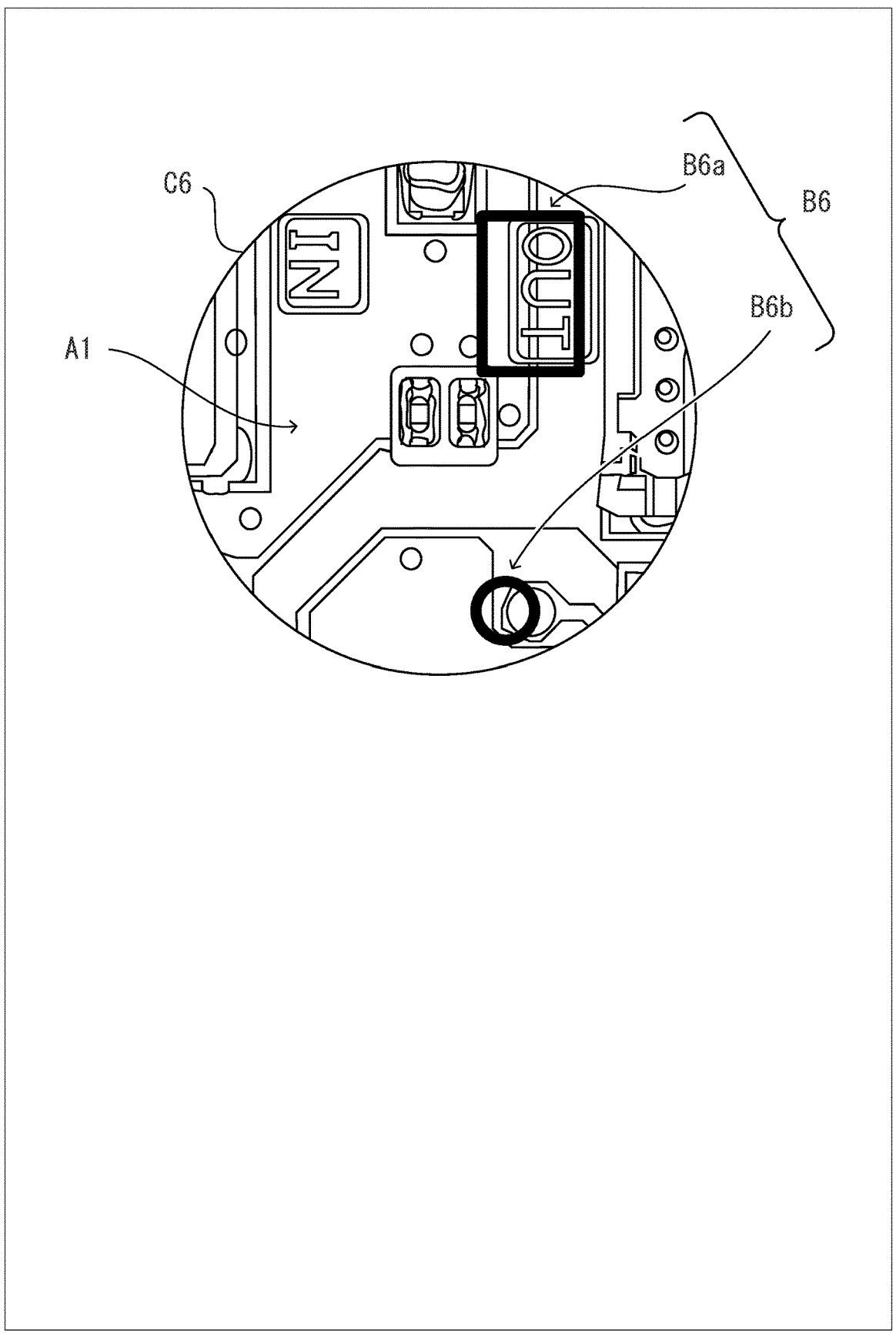
FIG. 16 is a diagram illustrating still another example of the superimposed image observed from the ocular lens.

FIGS. 13 and 15 illustrate a case where a slide including text content is selected as the target slide. However, the slide may include graphic content such as a square, a circle, or a straight line. FIG. 16 illustrates an example in which an auxiliary image B6 including rectangular graphic content B6a and circular graphic content B6b is projected on the image plane. The auxiliary image B6 may be used for alignment of the sample, for example. The user may move the stage such that the content included in the auxiliary image B6 overlaps a predetermined structure in the sample while observing a superimposed image C6 in which the auxiliary image B6 is superimposed on the optical image A1.

Figure 17:
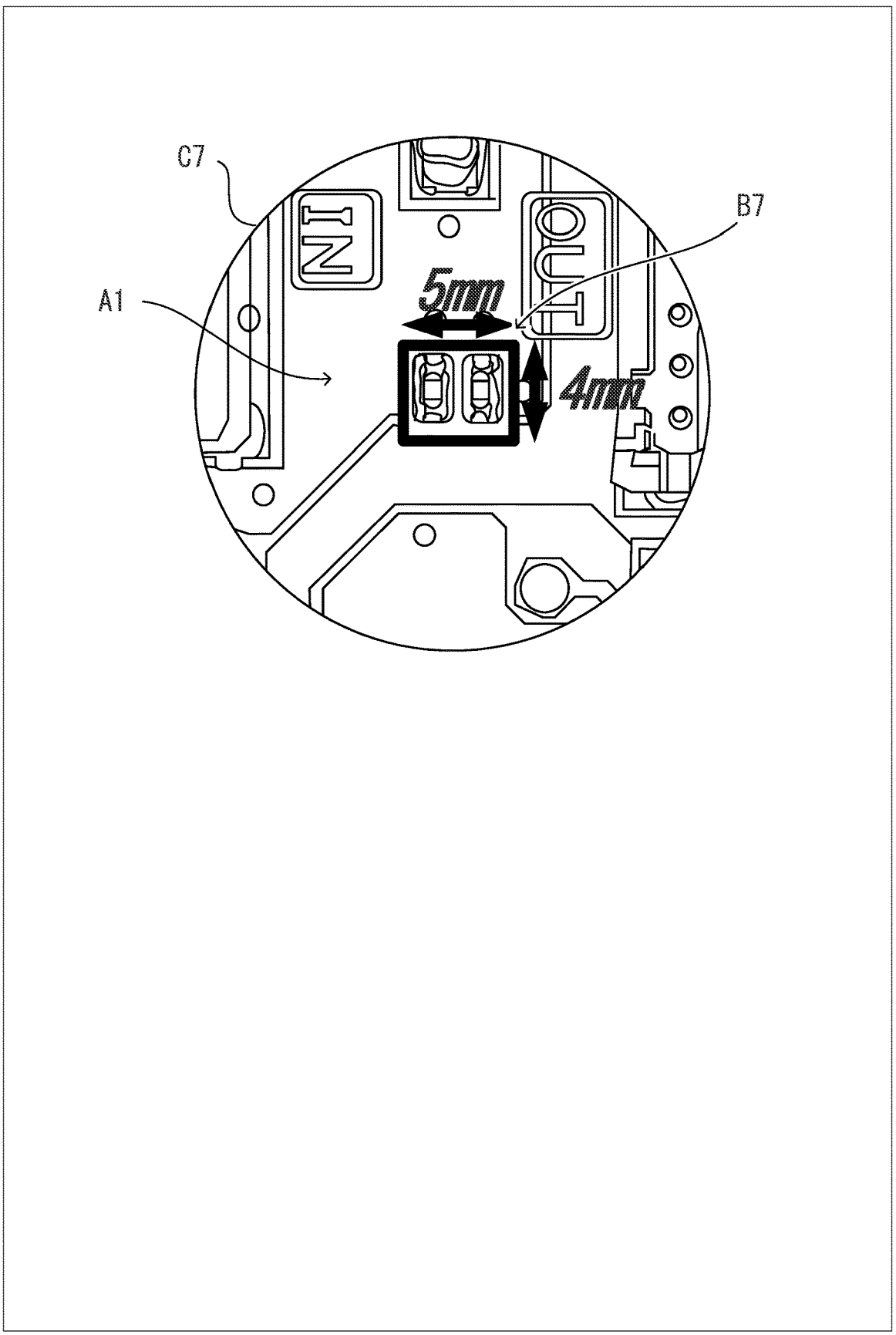
FIG. 17 is a diagram illustrating still another example of the superimposed image observed from the ocular lens.

When the alignment using the auxiliary image B6 is completed, the user may instruct switching of the slide to inspect whether the size of the specific structure in the sample meets the specification. For example, FIG. 17 illustrates an example in which a superimposed image C7 in which an auxiliary image B7 including rectangular gauge content is superimposed on the optical image A1 is formed on the image plane. The gauge content may include vertical and horizontal dimension indications as illustrated in FIG. 17. The gauge content is created in advance in a size corresponding to the specification. The user may compare the gauge content included in the auxiliary image B7 with the specific structure of the sample appearing in the optical image to inspect whether the size of the specific structure meets the specification.

Figure 18:
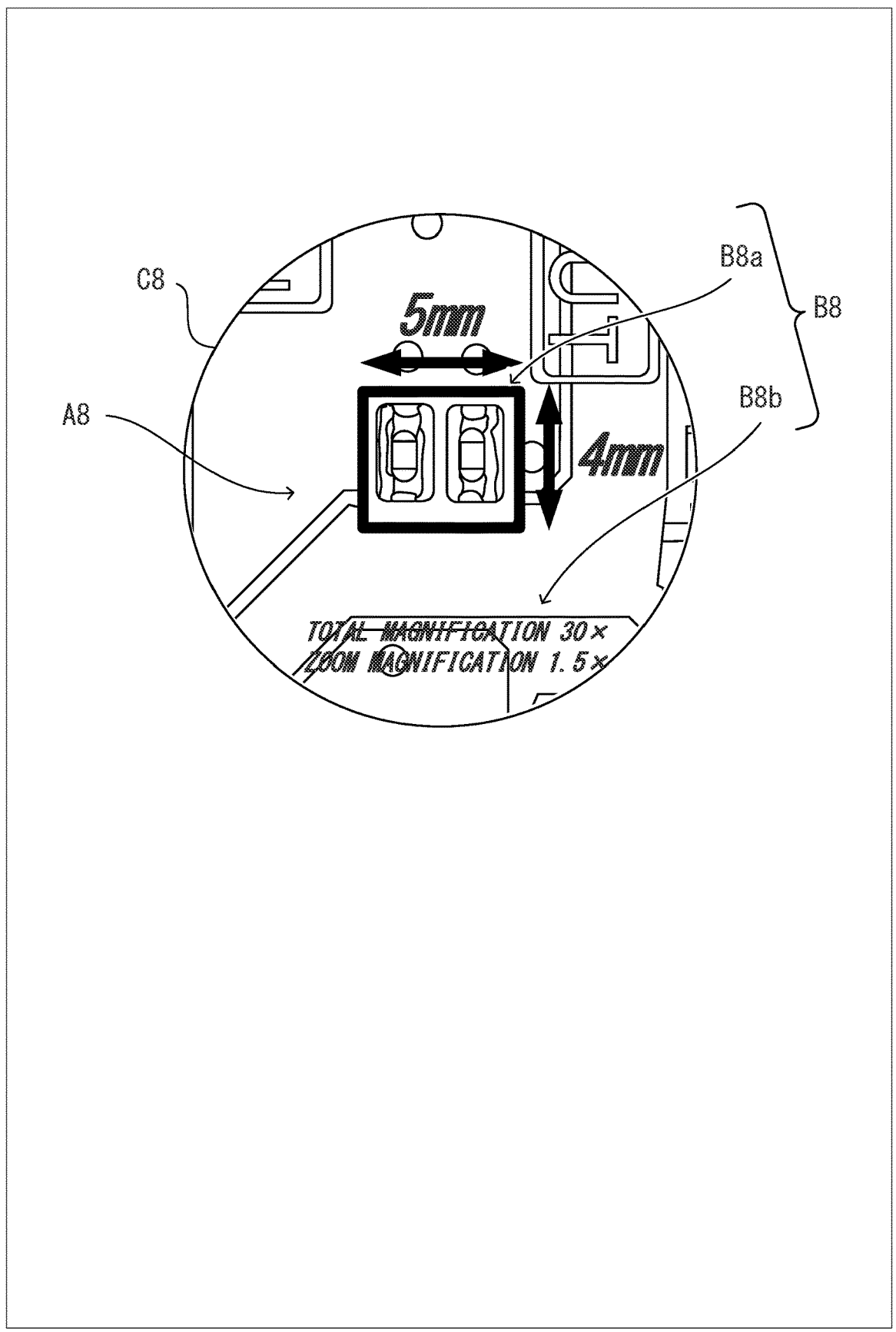
FIG. 18 is a diagram illustrating still another example of the superimposed image observed from the ocular lens.

The user may change the observation magnification by operating the zoom handle 130 during the inspection. By observing at a higher magnification, it may be carefully inspected whether the specific structure of the sample meets the specification. FIG. 18 illustrates a superimposed image C8 in which an auxiliary image B8 is superimposed on an optical image A8 of the sample enlarged at a higher magnification than the optical image A1. The auxiliary image B8 includes gauge content (content B8a) enlarged in accordance with the optical image A8.

Further, as illustrated in FIG. 18, the auxiliary image B8 may include setting information indicating the current magnification of the microscope 100 as text content (content B8b) in addition to the gauge content (content B8a). Note that, although FIG. 18 illustrates an example in which the auxiliary image B8 includes the total magnification and the zoom magnification of the microscope 100, only one of these magnifications may be included in the auxiliary image B8. In addition, the magnification (for example, the magnification of the objective, the zoom magnification, the magnification of the intermediate tube, the magnification of the ocular lens, and the like) of each optical system that affects the total magnification may be projected on the image plane. As a result, it is possible to recognize the set magnification while performing observation during the work. In particular, since the magnification that the user adjusts while looking into the ocular lens, such as the zoom magnification, is displayed as the auxiliary image, it is not necessary to take the eyes off the ocular lens only to check the magnification, which greatly contributes to the improvement of the work efficiency. Note that the setting information may be displayed at a predetermined timing, for example, after an operation of changing the magnification. Furthermore, the setting information is not limited to the information regarding the magnification, and may be information regarding a current arbitrary setting of the microscope 100. For example, the type of the objective, the setting of a filter, and the like may be included in the auxiliary image as the setting information.

The projection of the auxiliary image including the content having the size according to the zoom magnification can be performed by the control device 200 generating the auxiliary image data based on the magnification information of the microscope optical system 110 and the information regarding the target slide. More specifically, the control device 200 may generate the auxiliary image data such that predetermined content among one or more pieces of content included in the target slide is included in the auxiliary image in a size corresponding to the magnification information. The predetermined content is the content of the first classification, and is, for example, a reticle or the like in addition to the above-described gauge. Since the gauge and the reticle are used for dimension measurement, it is desirable that the gauge and the reticle be projected by changing the sizes according to the observation magnification.

On the other hand, the control device 200 may generate the auxiliary image data such that content other than the predetermined content among the one or more pieces of content included in the target slide is included in the auxiliary image in a predetermined size. The content other than the predetermined content is the content of the second classification, and is, for example, text content. It is desirable that the text be displayed at a constant ratio with respect to the field number, that is, at a constant size regardless of the observation magnification.

It is desirable that the control device 200 classify the content included in the slide into, for example, the content of the first classification or the content of the second classification based on the information regarding the type of the content, and generate the auxiliary image data such that the size varies according to the classification result. Note that examples of the type of content include a pen, a figure, a text, a still image, a moving image, a gauge, a reticle, an image analysis result, a timer, a dashboard, external device information, content for measurement, and the like.

Figure 19:
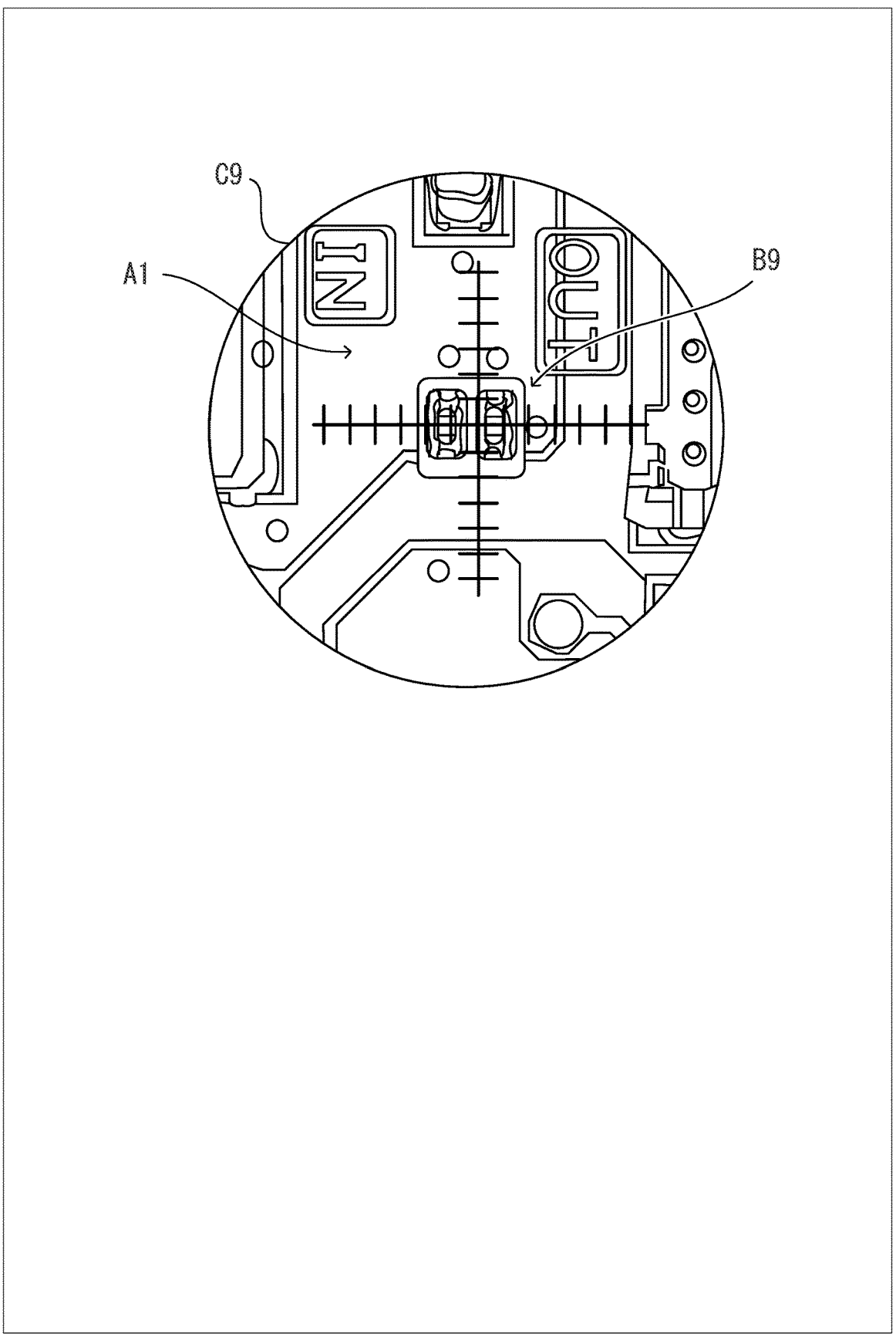
FIG. 19 is a diagram illustrating still another example of the superimposed image observed from the ocular lens.

FIG. 19 illustrates an example in which a superimposed image C9 in which an auxiliary image B9 including cross-shaped reticle content is superimposed on the optical image A1 is formed on the image plane. Similarly to the gauge content, the reticle content is the content of the first classification, and is enlarged or reduced according to the zoom magnification and projected. The user may switch the slide to change the state to a state in which the auxiliary image B9 is projected, and inspect the sample by recognizing the size of the specific structure with the scale of the reticle included in the auxiliary image B9.

Figure 20:
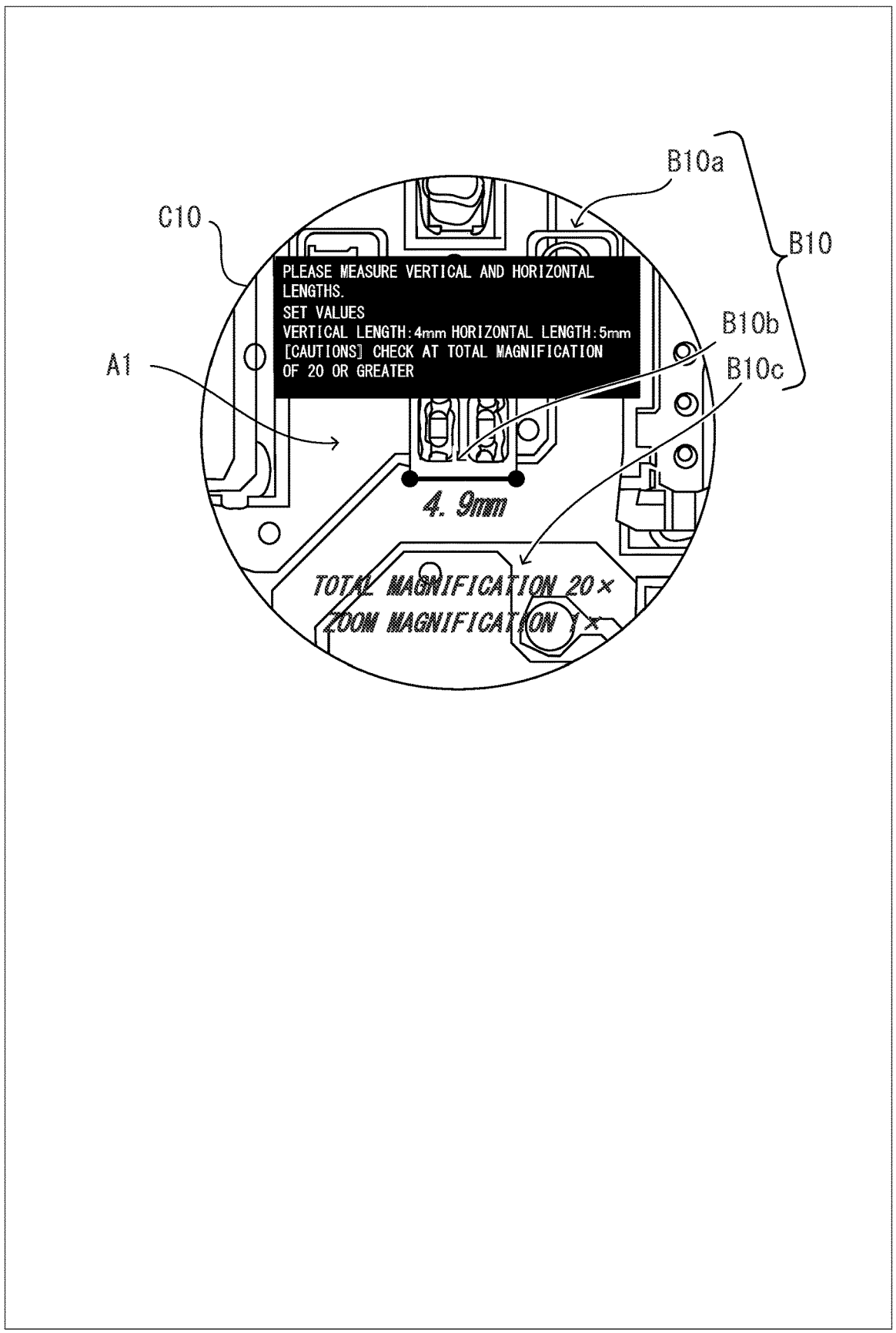
FIG. 20 is a diagram illustrating still another example of the superimposed image observed from the ocular lens.

FIG. 20 illustrates an example in which a superimposed image C10 in which an auxiliary image B10 including text content (content B10a), content (content B10b) for line measurement, and text content (content B10c) is superimposed on the optical image A1 is formed on the image plane. The user may switch the slide to change the state to a state in which the auxiliary image B10 is projected, measure the size of the predetermined structure, and determine the pass or fail of the inspection. As illustrated in FIG. 20, the user may use an input device such as the mouse 401 to designate a range to be measured so as to instruct measurement, and the control device 200 may cause the projector 113 to project the auxiliary image B10 including the measurement result on the image plane. Such dynamic display can be performed by the control device 200 generating the auxiliary image data based on position information input by the user in addition to the magnification information of the microscope optical system 110 and the information regarding the target slide. Note that not only the content for measurement but also content for surface measurement may be included in the auxiliary image. The setting information (magnification) displayed as the text content is particularly effective when the magnification is designated as a requirement at the time of measurement. Since the magnification is included in the auxiliary image, the user can check that the magnification requirement designated in the text content is satisfied without taking his/her eyes off the ocular lens, and can input the measurement instruction.

Figure 21:
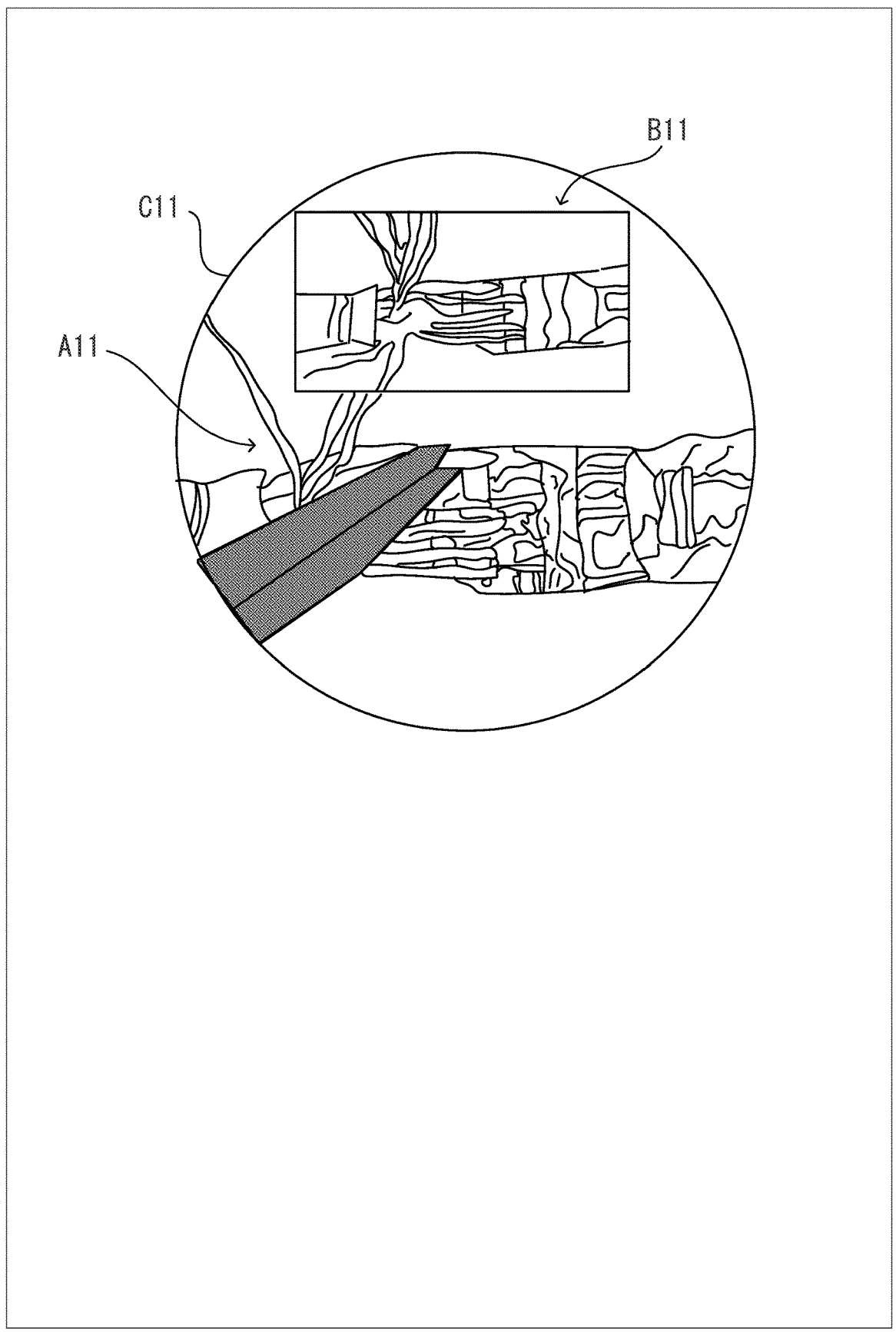
FIG. 21 is a diagram illustrating still another example of the superimposed image observed from the ocular lens.
Figure 22:
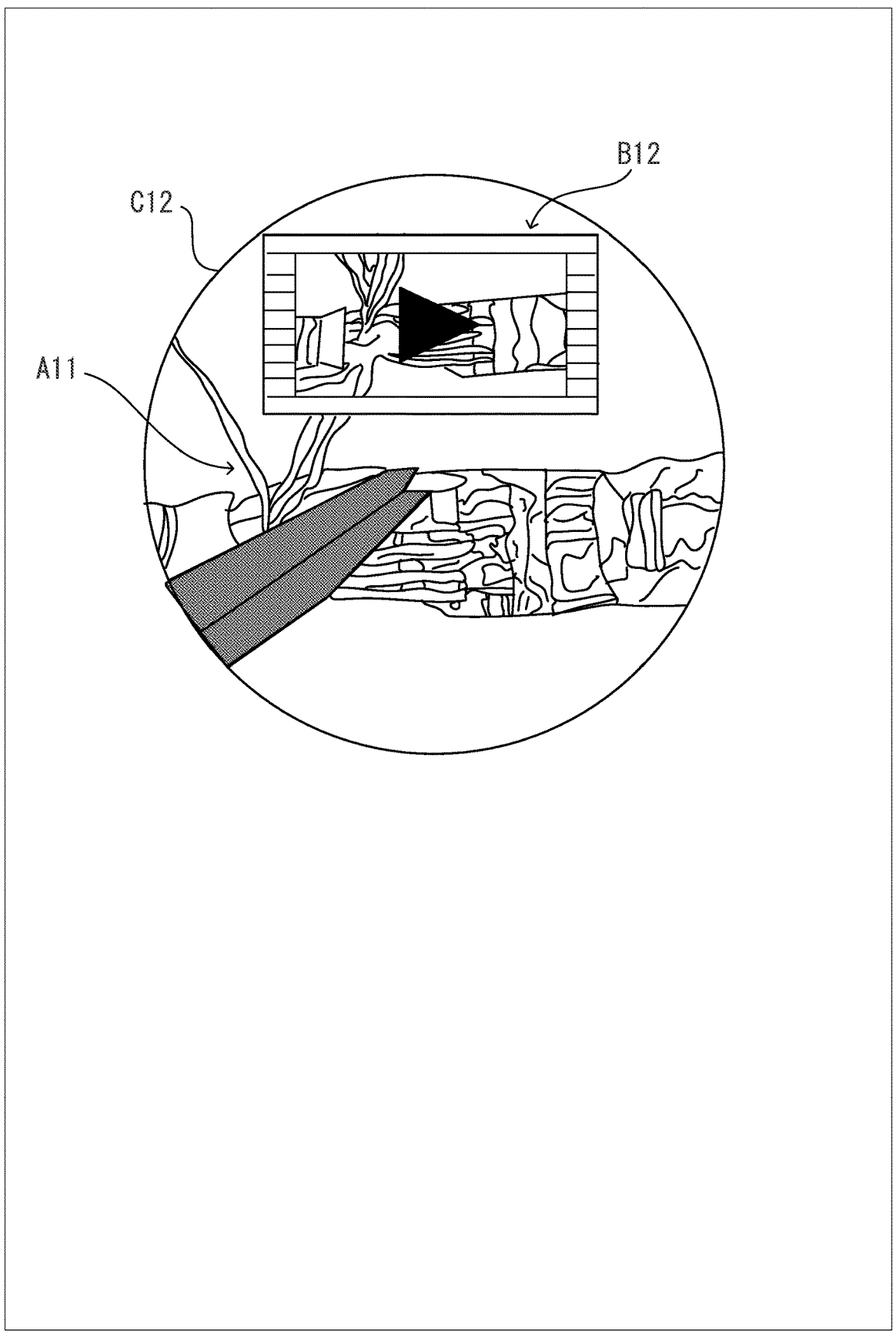
FIG. 22 is a diagram illustrating still another example of the superimposed image observed from the ocular lens.

In addition, the slide may include a still image or a moving image as content. FIG. 21 illustrates an example in which a superimposed image C11 in which an auxiliary image B11 including a still image is superimposed on an optical image A11 is formed on the image plane. The user may perform the work while checking the state of the sample after the work is correctly performed on the still image, that is, the sample. FIG. 22 illustrates an example in which a superimposed image C12 in which an auxiliary image B12 including a moving image is superimposed on the optical image A1l is formed on the image plane. The user may perform the work while checking the correct work procedure in the moving image.

Figure 23:
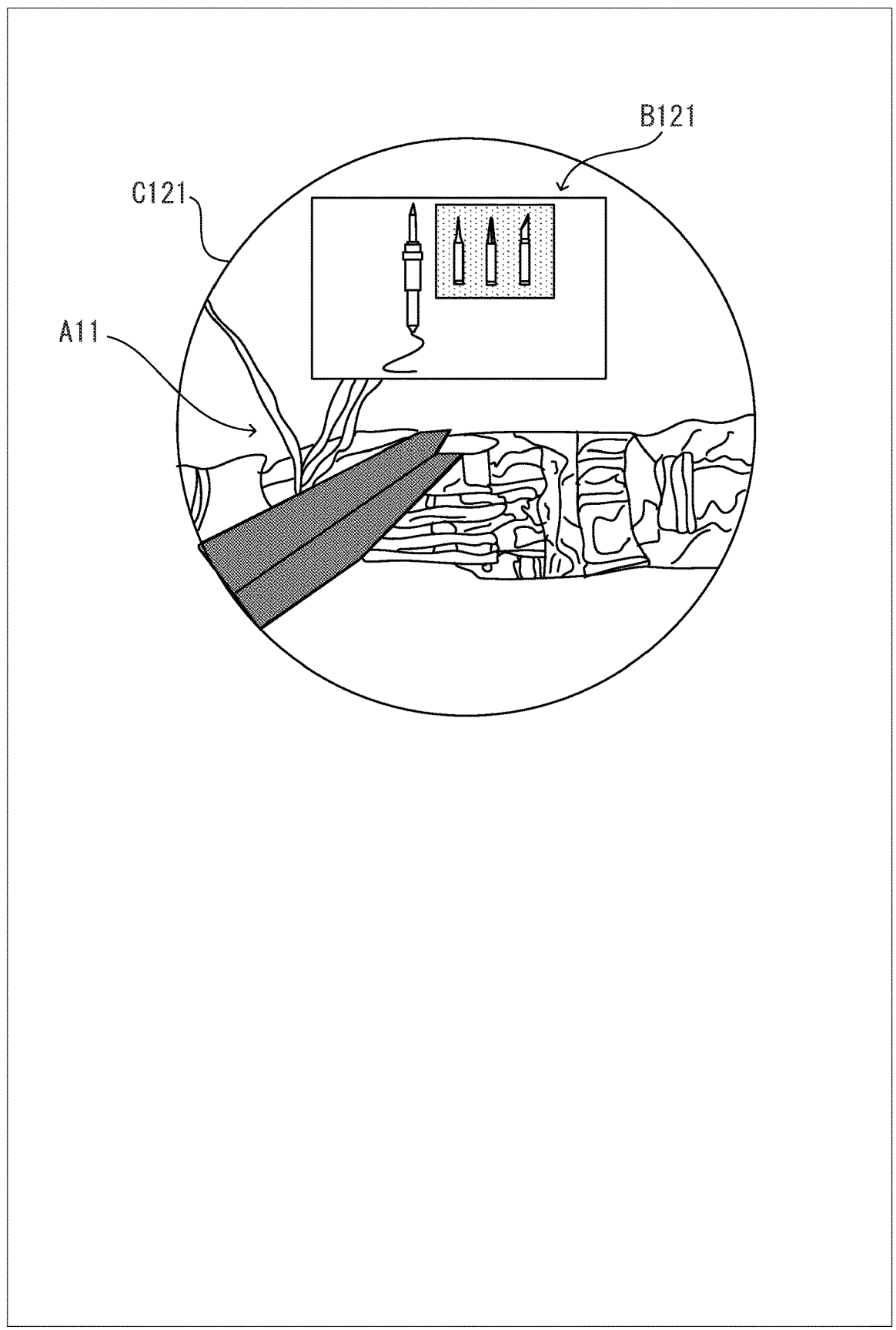
FIG. 23 is a diagram illustrating still another example of the superimposed image observed from the ocular lens.
Figure 24:
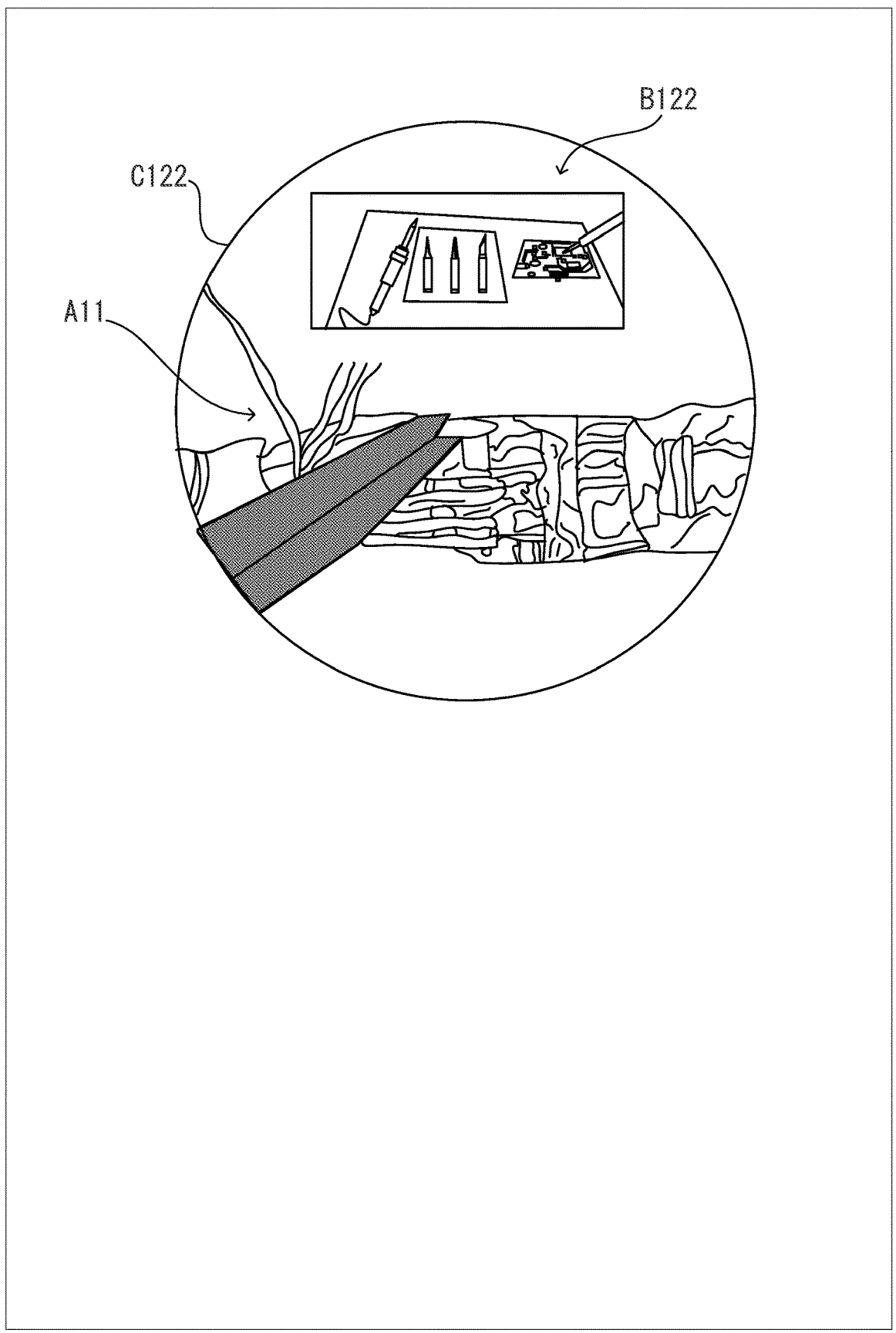
FIG. 24 is a diagram illustrating still another example of the superimposed image observed from the ocular lens.

The image displayed on the image plane as the auxiliary image may be an image captured in real time by the web camera 500. As a result, the user can perform the work while checking both the micro image (optical image of the sample) and the macro image (auxiliary image) obtained by imaging the periphery of the microscope 100, the user's hand, or the like with the web camera 500. FIG. 23 illustrates an example in which a superimposed image C121 in which an auxiliary image B121 including an image obtained by imaging tools placed around the microscope 100 with the web camera 500 is superimposed on the optical image A1l is formed on the image plane. Furthermore, FIG. 24 illustrates an example in which a superimposed image C122 in which an auxiliary image B122 including an image obtained by simultaneously imaging a work area and tools placed around the work area with the web camera 500 is superimposed on the optical image A1l is formed on the image plane. As illustrated in FIGS. 23 and 24, the peripheral tools are shown as auxiliary images, so that the tools can be smoothly switched.

Figure 25:
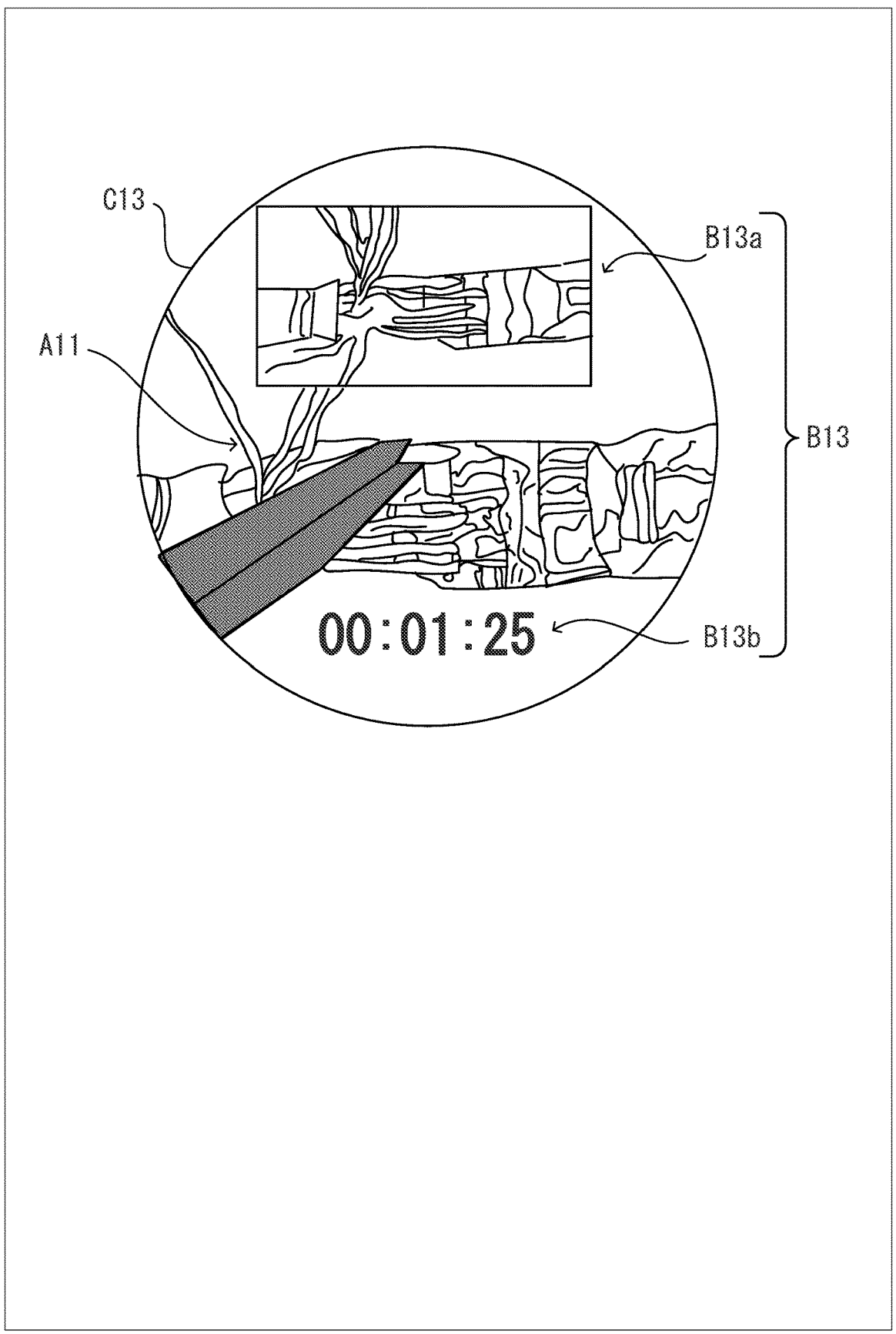
FIG. 25 is a diagram illustrating still another example of the superimposed image observed from the ocular lens.
Figure 26:
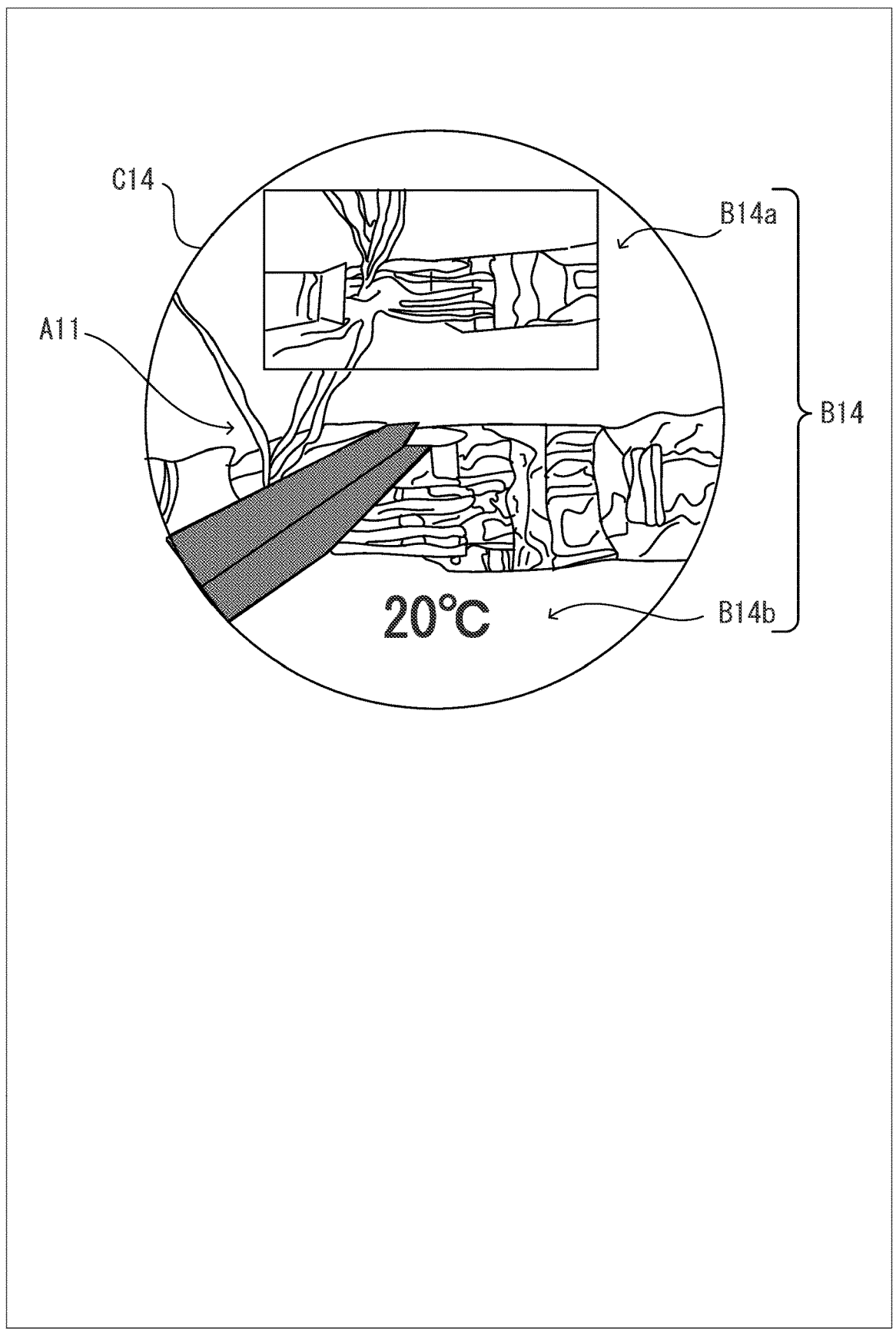
FIG. 26 is a diagram illustrating still another example of the superimposed image observed from the ocular lens.

In addition, the slides may include information of a timer or other sensors as content. FIG. 25 illustrates an example in which a superimposed image C13 in which an auxiliary image B13 including a still image (content B13a) and an elapsed time from the start of the work (content B13b) is superimposed on the optical image A1l is formed on the image plane. By checking the elapsed time with the content B13b, the user may perform the work while checking whether it takes too much time. FIG. 26 illustrates an example in which a superimposed image C14 in which an auxiliary image B14 including a still image (content B14a) and a temperature (content B14b) of the work area measured by a thermometer (not illustrated) is superimposed on the optical image A1l is formed on the image plane. The user may perform the work while checking that the temperature of the work area is within an appropriate range in the content B14b.

Figure 27:
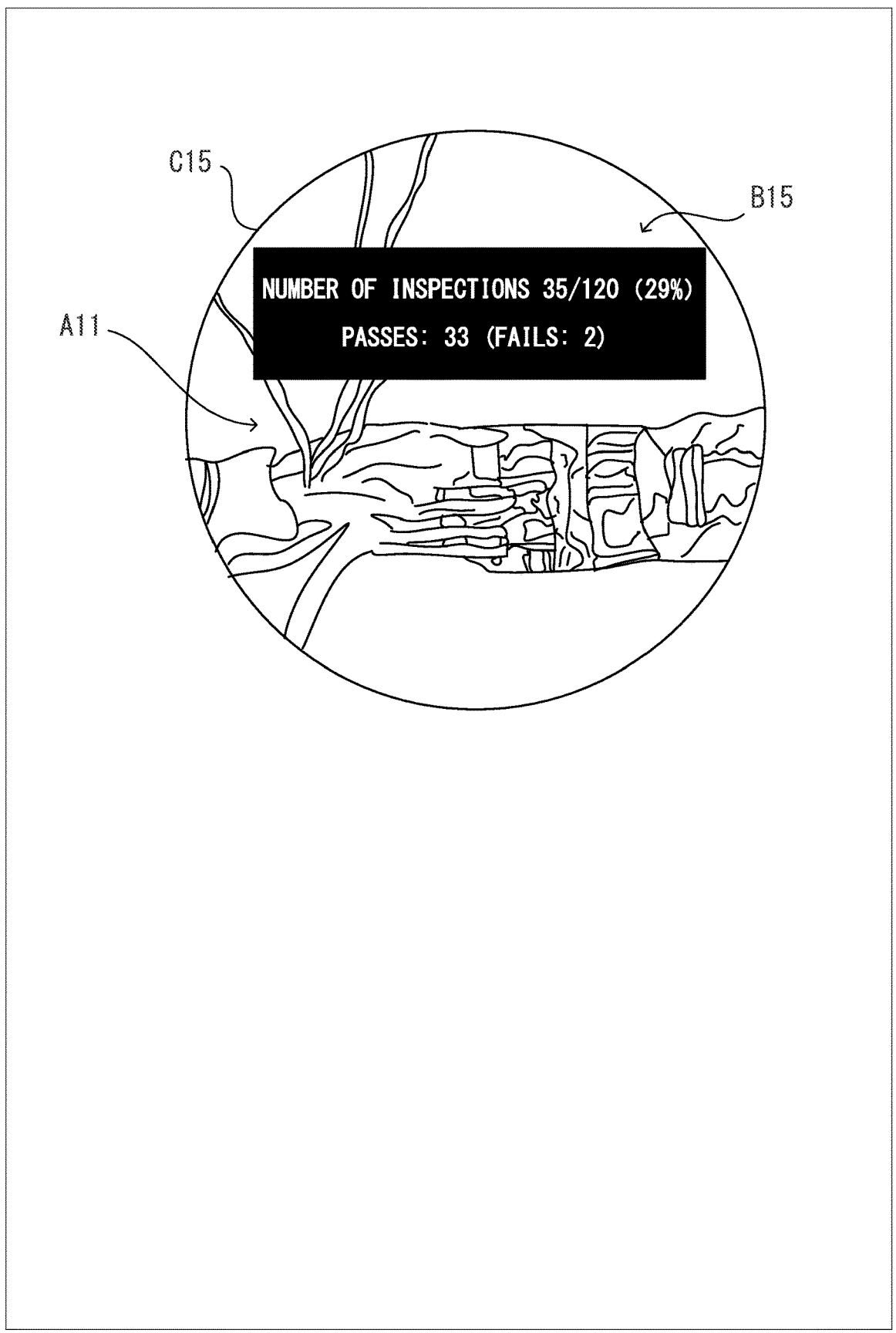
FIG. 27 is a diagram illustrating still another example of the superimposed image observed from the ocular lens.

The last slide may include text content indicating a work result. FIG. 27 illustrates an example in which a superimposed image C15 in which an auxiliary image B15 including text content is superimposed on the optical image A1l is formed on the image plane. The user may check the progress and results of the assembly work with the auxiliary image B15. The control device 200 may generate auxiliary image data corresponding to the auxiliary image B15 by communicating with another device to collect the information.

Figure 28:
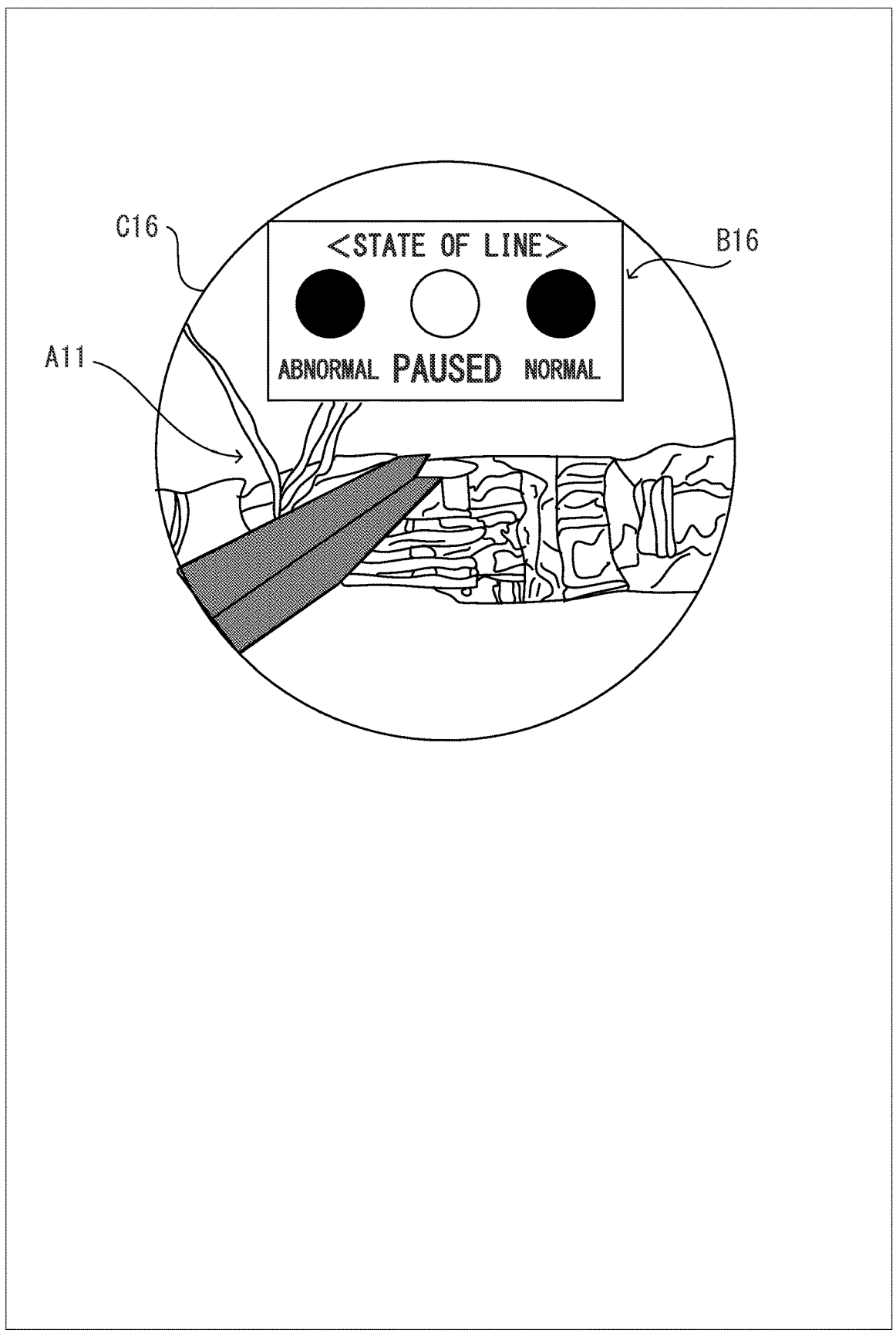
FIG. 28 is a diagram illustrating still another example of the superimposed image observed from the ocular lens.

Note that the control device 200 controls the projector 113 to display the plurality of slides included in the slide set selected by the user in the order determined according to the switching instruction, but may control the projector 113 to display a specific slide by interruption. For example, when a manufacturing line which the user is in charge of is paused, the microscope system 1 may notify such information by the auxiliary image. FIG. 28 illustrates an example in which a superimposed image C16 in which an auxiliary image B16 including dashboard content indicating the state of the manufacturing line is superimposed on the optical image A1l is formed on the image plane. The user may check the state of the manufacturing line with the auxiliary image B16.

Figure 29:
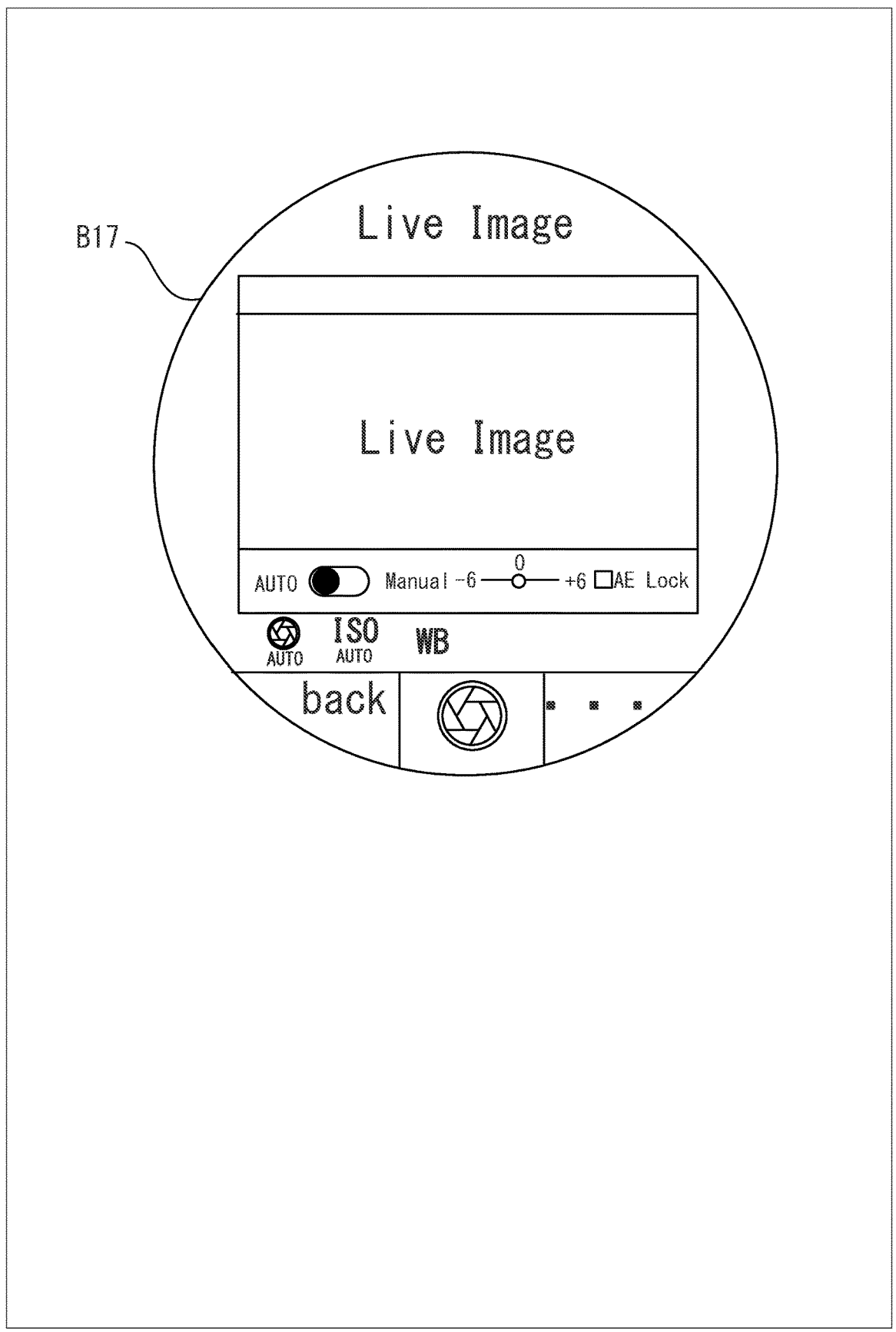
FIG. 29 is a diagram illustrating an example of an imaging screen observed from the ocular lens.
Figure 30:
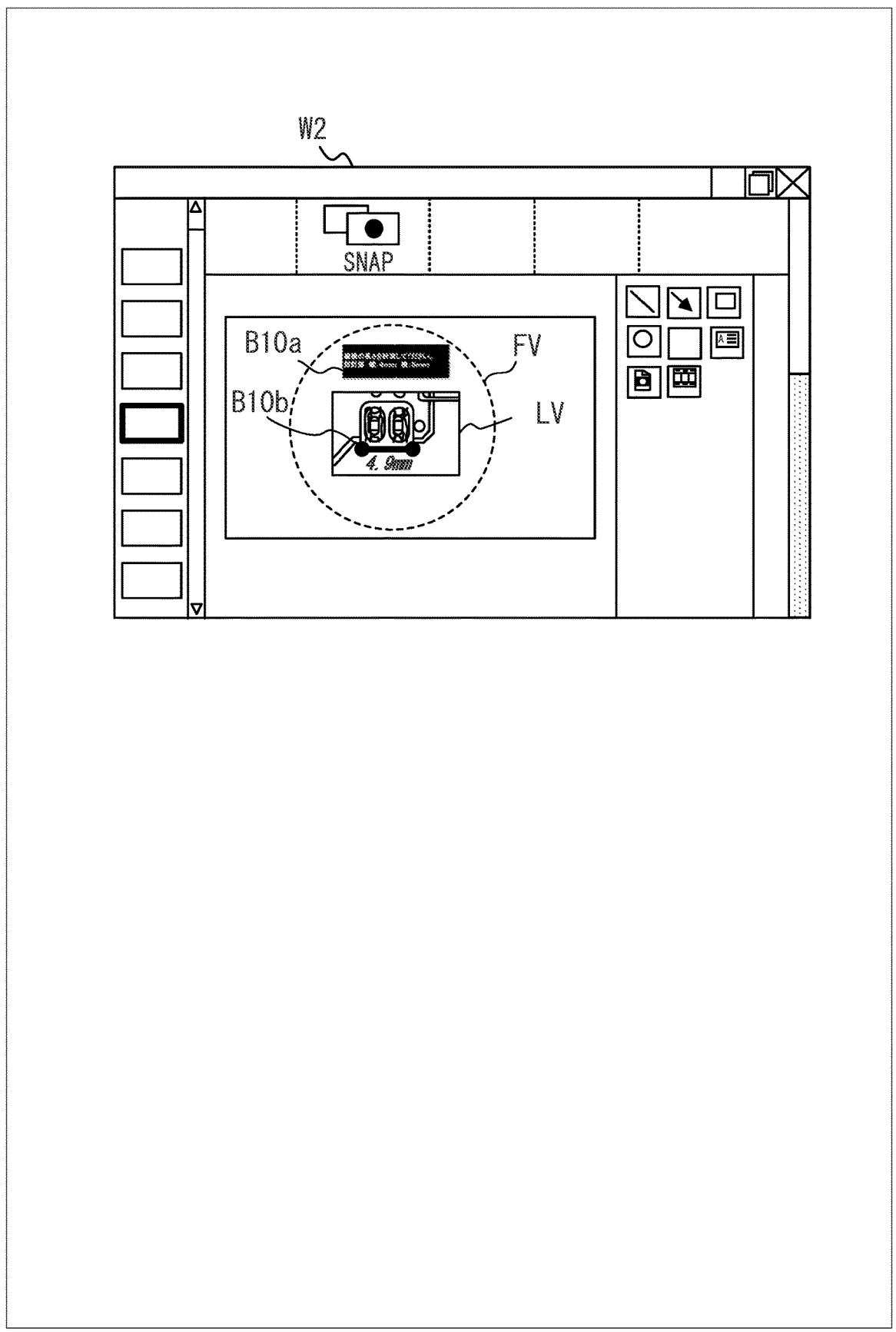
FIG. 30 is a diagram illustrating an example of an imaging screen observed on a monitor.
Figure 31:
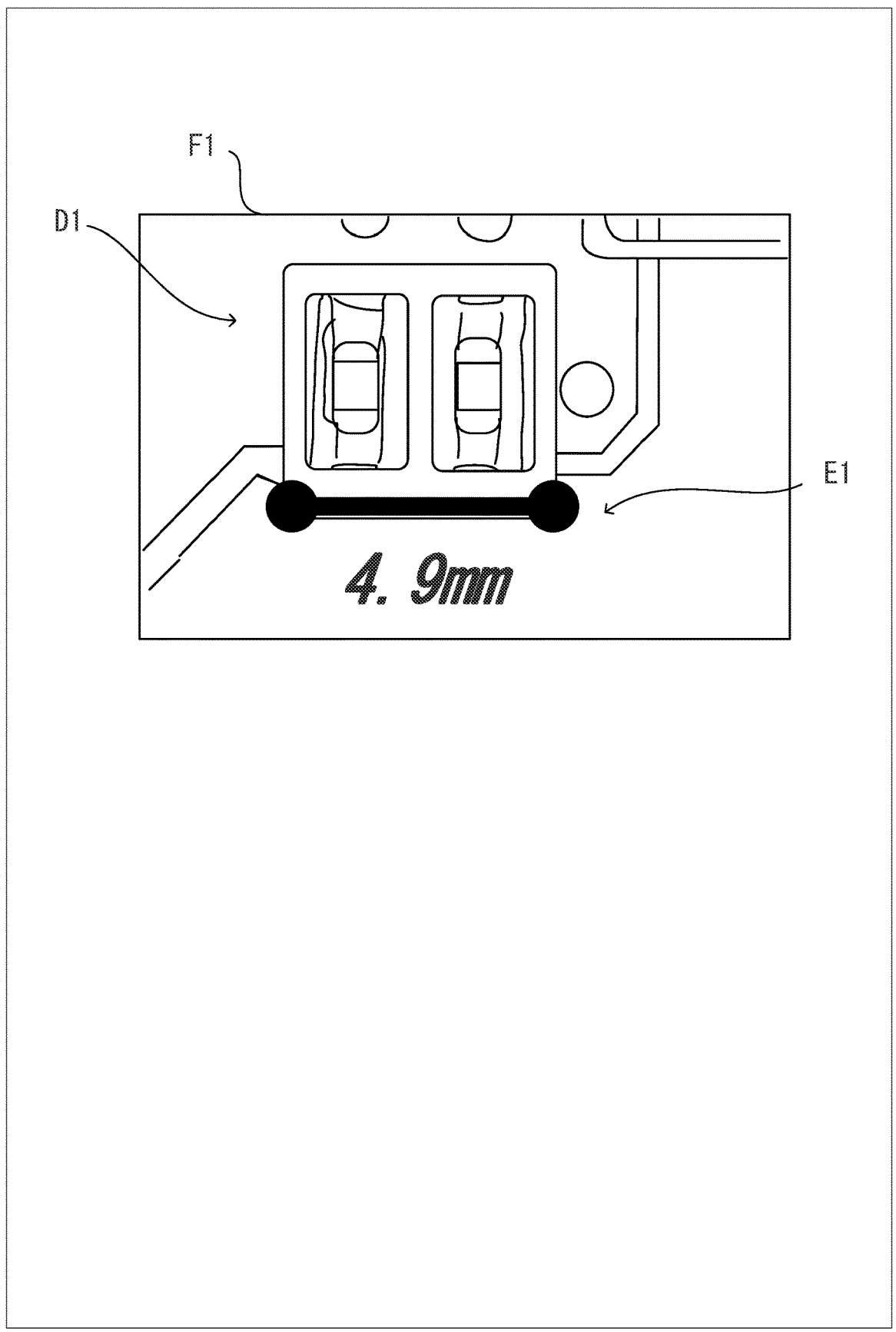
FIG. 31 is a diagram illustrating an example of a recording image.
Figure 32:
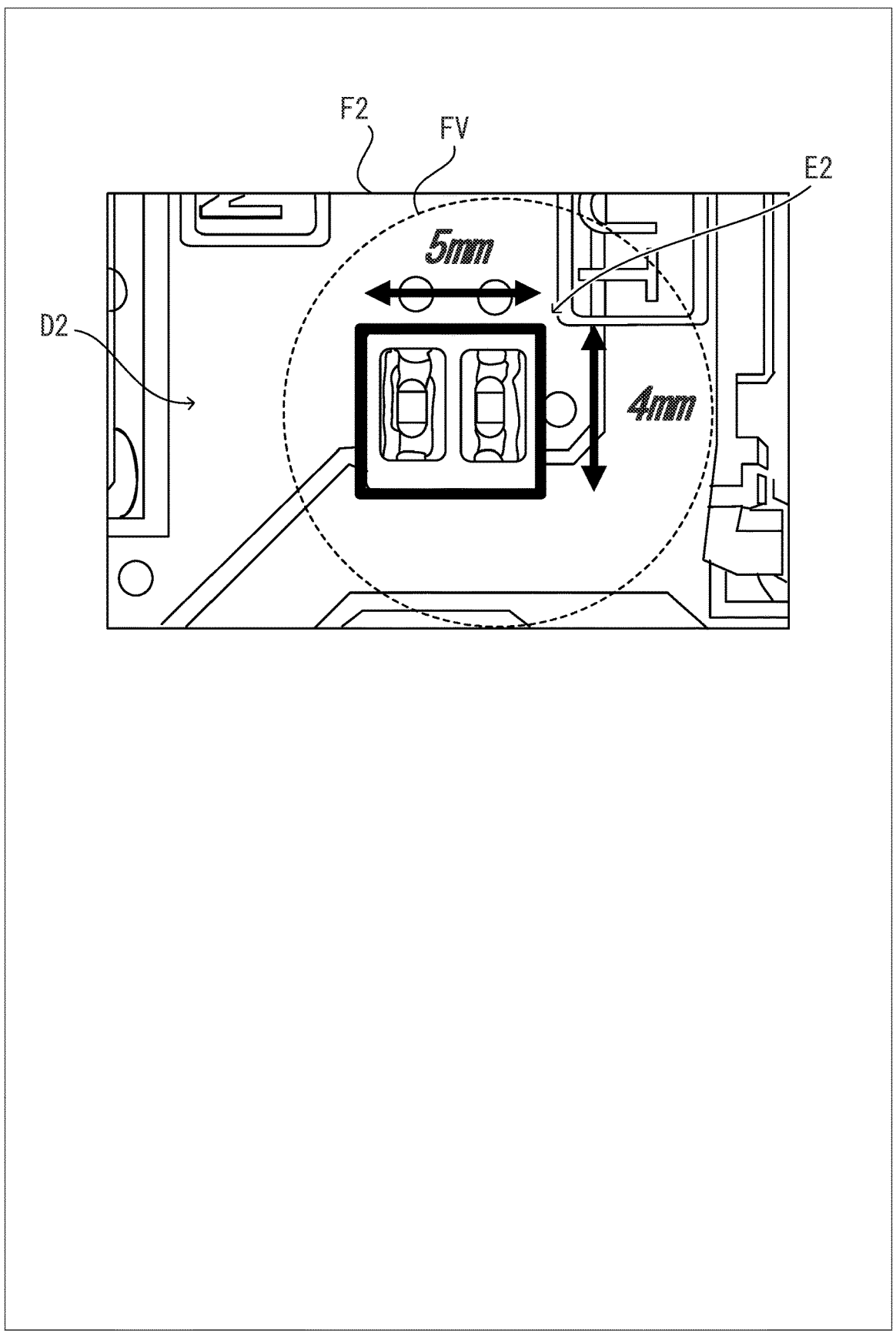
FIG. 32 is a diagram illustrating another example of the recording image.
Figure 33:
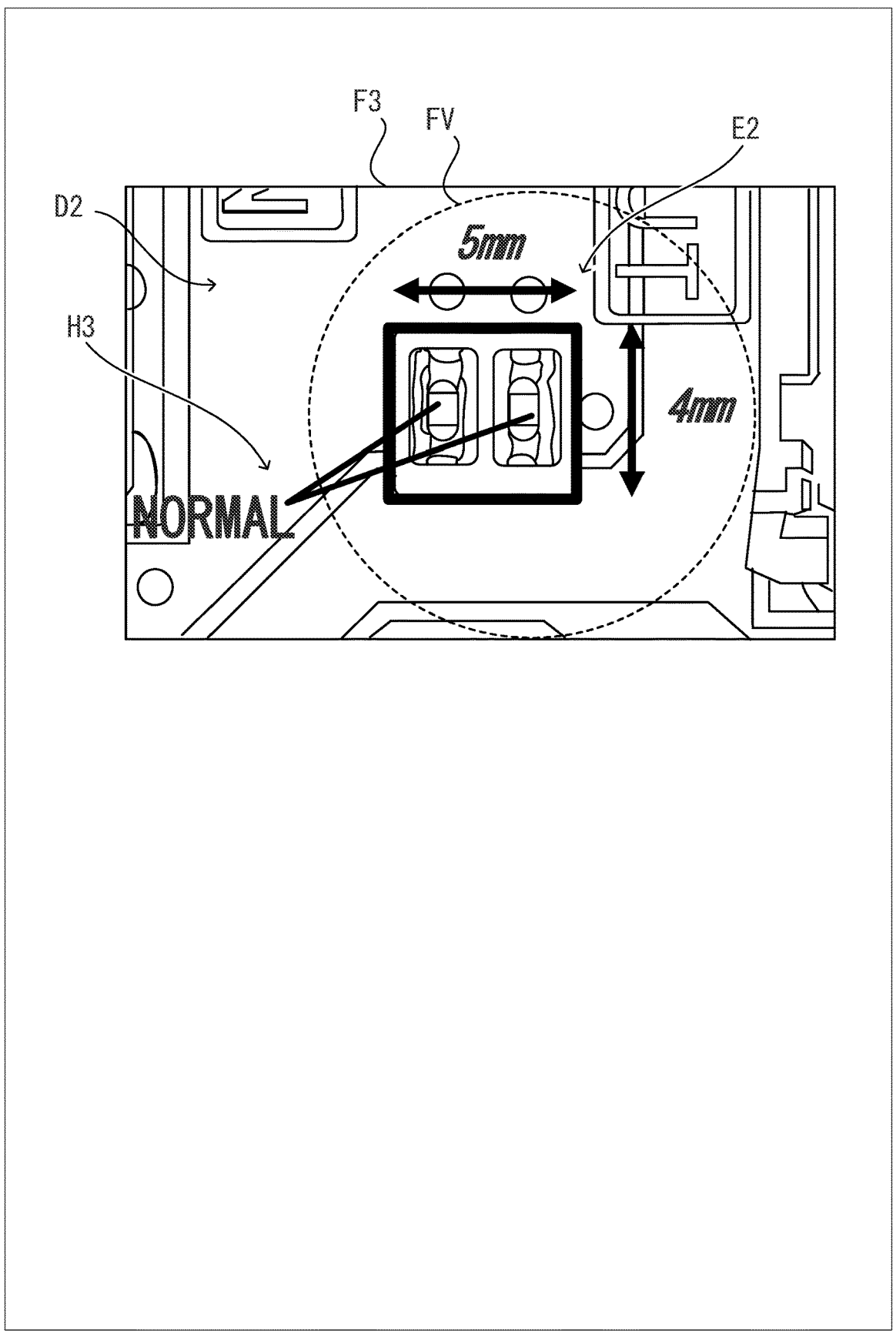
FIG. 33 is a diagram illustrating still another example of the recording image.
Figure 34:
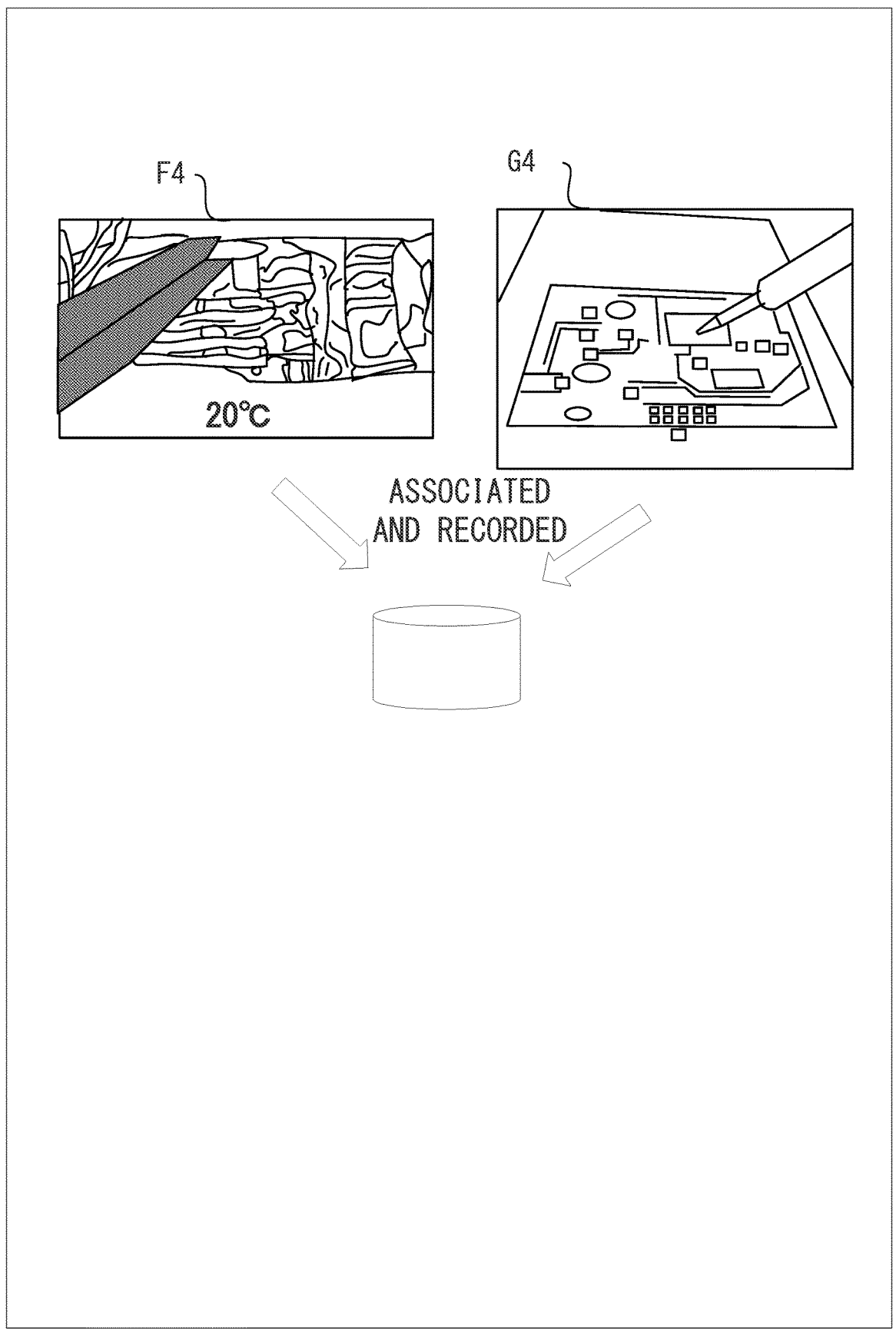
FIG. 34 is a diagram for describing an image recording method.

FIG. 29 is a diagram illustrating an example of an imaging screen observed from the ocular lens. FIG. 30 is a diagram illustrating an example of an imaging screen observed on the monitor. FIGS. 31 to 33 are diagrams illustrating recording images. FIG. 34 is a diagram for describing an image recording method. A method of creating a work record including an image will be described below with reference to FIGS. 29 to 34.

At the time of the assembly work, the user may instruct to image or record the sample, or may record a still image or a moving image as evidence of the work in the control device 200. The user may input an image capturing or recording instruction while looking into the ocular lens 106. For example, when a camera button is pressed on the home screen illustrated in FIG. 11, an auxiliary image B17 illustrated in FIG. 29 is projected on the image plane, and the imaging screen is displayed. The user may input an imaging instruction while viewing a live image in the auxiliary image B17 illustrated in FIG. 29. The live image may be acquired by the imaging device 112, for example. By inputting the imaging instruction while checking the live image, focus adjustment, brightness adjustment, and the like can be performed before imaging.

Note that the imaging instruction may be input from a window W2 displayed on the monitor 300 as illustrated in FIG. 30. FIG. 30 illustrates a state in which a live image LV acquired by the imaging device 112 and the auxiliary image (content B10a and content B10b) projected on the image plane are displayed in a field-of-view mark FV indicating the field of view of the microscope 100. The user may input an imaging instruction from the window W2.

When detecting an imaging instruction or a recording instruction (YES in step S17), the control device 200 controls the imaging device 112 to perform imaging or recording (step S18). Here, the control device 200 causes a recording device to record a digital image (captured image) of the sample captured by the imaging device 112 in association with the auxiliary image projected on the image plane at the time of the image capturing. Note that the recording device may be provided in the control device or may be provided on a server placed on a network.

For example, as illustrated in FIG. 31, the control device 200 may create a recording image F1 in which a captured image D1 and an auxiliary image E1 are synthesized, and record the recording image F1 in the recording device. Further, the control device 200 may record the captured image D1 and the auxiliary image E1 as separate files, and additionally record information associating the captured image D1 with the auxiliary image E1. When only a part of the auxiliary image E1 is included in the field of view of the imaging device 112, the auxiliary image E1 may be recorded after only the part included in the field of view is trimmed.

In FIG. 31, the configuration of the recording image has been described by exemplifying a case where the field of view of the imaging device 112 is narrower than the field of view of the microscope optical system 110. In a case where the field of view of the imaging device 112 is wider than the field of view of the microscope optical system 110, as illustrated in FIG. 32, the control device 200 may create a recording image F2 in which a field-of-view mark FV indicating the field of view of the microscope optical system 110 is synthesized in addition to a captured image D2 and an auxiliary image E2, and record the recording image F2 in the recording device. The control device 200 may record the captured image D2, the auxiliary image E2, and the field-of-view mark FV as separate files, and additionally record information associating the captured image D2, the auxiliary image E2, and the field-of-view mark FV with each other.

Furthermore, as illustrated in FIG. 33, the control device 200 may create image data of a recording image F3 obtained by synthesizing an annotation image H3 in addition to the captured image D2, the auxiliary image E2, and the fieldof-view mark FV, and record the image data in the recording device. The annotation image H3 is projected using annotation image data created in response to a drawing instruction input by the user using any one or more of the input devices 400. In this respect, the annotation image H3 is different from the auxiliary image E2 based on the slide. However, the annotation image H3 is similar to the auxiliary image E2 in that the annotation image H3 is superimposed on the image plane by the projector 113 based on the image data generated by the control device 200.

The user may input the drawing instruction while looking into the ocular lens 106. For example, characters, figures, and the like may be drawn on the image plane by pressing a pen button on the home screen illustrated in FIG. 11. Furthermore, characters, figures, and the like may be added on the window W2 illustrated in FIG. 30. In this case, when characters are written as content on the live image LV with a pen, the content is projected at a position on the optical image that matches a position on the live image LV where the content is placed. The content may be a graphic such as a line, an arrow, a square, or a circle, or may be a text, an image (still image, moving image), or the like, in addition to a character written with a pen. The user can leave notes and comments on the work result using such a drawing function. The control device 200 may record the captured image D2, the auxiliary image E2, and the annotation image H3 as separate files, and additionally record information associating the captured image D2, the auxiliary image E2, and the annotation image H3 with each other.

Further, as illustrated in FIG. 34, the control device 200 may record an image G4 captured by the web camera 500 in association with a recorded image F4 in the recording device. By recording the image G4 in association with the recorded image F4, the state of the user at the time of the work can also be recorded. The image G4 and the recorded image F4 may be recorded as one image.

Note that the example has been described in which the recorded image is acquired at the end of the assembly work and used as evidence of the work performed by the user. However, the work record may be acquired in the middle of the assembly work or may be acquired a plurality of times at any timing during the work. In addition, although the still image is exemplified as the recorded image, the recorded image may be a moving image, and the control device 200 may record the work from the start to the end of the work in the moving image. For example, the image G4 and the recorded image F4 illustrated in FIG. 34 may be recorded as a moving image and may be synthesized and recorded as one image. As a result, the image G4 and the recorded image F4 can be simultaneously reproduced on the same time axis, and the relationship between the content of the work under the microscope and the state of the user can be easily recognized. Therefore, the analysis of the work is also facilitated. In addition, in the case of recording a moving image, chapter information linked to a page of a slide reproduced as an auxiliary image may be written in the moving image. Therefore, the searchability is improved when the moving image is checked later.

In addition, the work record is not limited to an image, and may be other information. As the work record, the control device 200 may record information not to be projected on the image plane, for example, setting information of the microscope system 1 together with an image as meta information. In addition, the control device 200 may record voice data, an operation log of the microscope system 1, or the like as a work record. In addition, the control device 200 may record, as a work record, information such as time information acquired from a time server or a user name used for logging in to the work support application, or may record, as a work record, information (a component name or a serial number) for identifying the sample. The work record is not limited to a case where the user explicitly instructs recording, and the control device 200 may automatically record the work record.

When an end instruction is input after the imaging instruction (YES in step S19), the control device 200 ends the assembly work support process illustrated in FIG. 12.

When the microscope system 1 performs the assembly work support process illustrated in FIG. 12, the user can appropriately switch the slide according to the work process. Therefore, necessary information can be obtained at a necessary timing without taking the eyes off the ocular lens 106. Therefore, according to the microscope system 1, the work of the user can be greatly improved in efficiency.

Next, a training mode of the work support application will be described. The training mode is started when the user presses a training start button on the home screen displayed on the monitor 300 as illustrated in FIG. 6. The training mode is different from the work mode in that a slide file created for training is used in the training mode, but is the same as the work mode in other points. Therefore, also in the training mode, the control device 200 performs the assembly work support process illustrated in FIG. 12.

In the training mode, a trainee who looks into the ocular lens 106 to perform work and a trainer who gives an instruction to the trainee while viewing an image displayed on the monitor 300 use the microscope system 1. The trainer can give an instruction to the trainee in real time by causing the projector 113 to project the annotation image using the drawing function used for evidence creation in the work mode.

Figure 35:
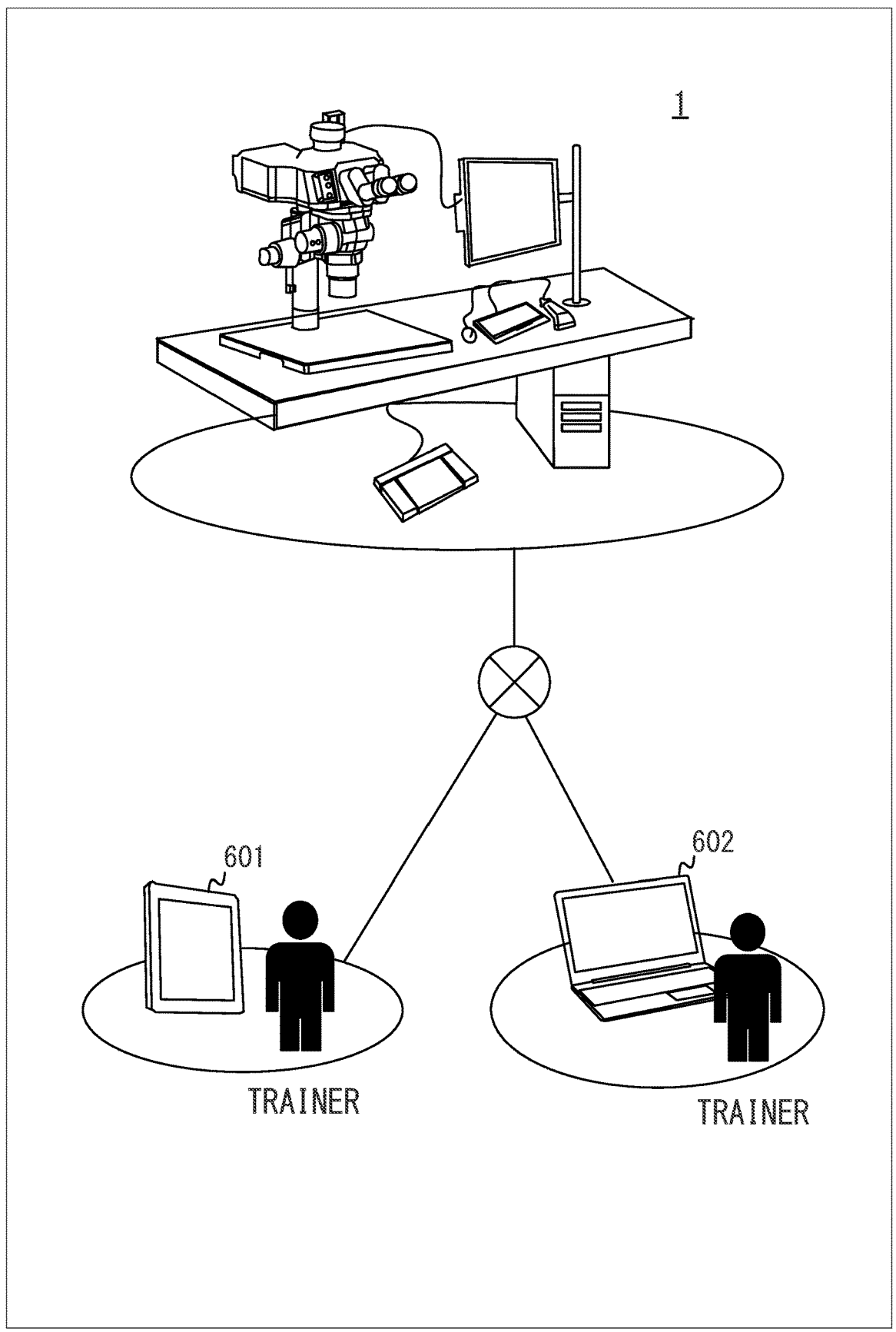
FIG. 35 is a diagram illustrating a configuration instructed by a trainer from a remote location.

Note that the trainer may give an instruction to the trainee from a remote location instead of operating the control device 200 using any one or more of the input devices 400 to give an instruction to the trainee. FIG. 35 is a diagram illustrating a configuration instructed by the trainer from the remote location. As illustrated in FIG. 35, the trainer may access the microscope system 1 from a remote terminal (remote terminal 601, remote terminal 602) connected to the microscope system 1 via a network such as the Internet. For example, the trainer may access the control device 200 from the remote terminal using a remote desktop function or the like, and directly operate the control device 200 to give an instruction to the trainee. In addition, the work support application may be installed in the remote terminal to give an instruction from the remote terminal to the trainee.

Figure 36:
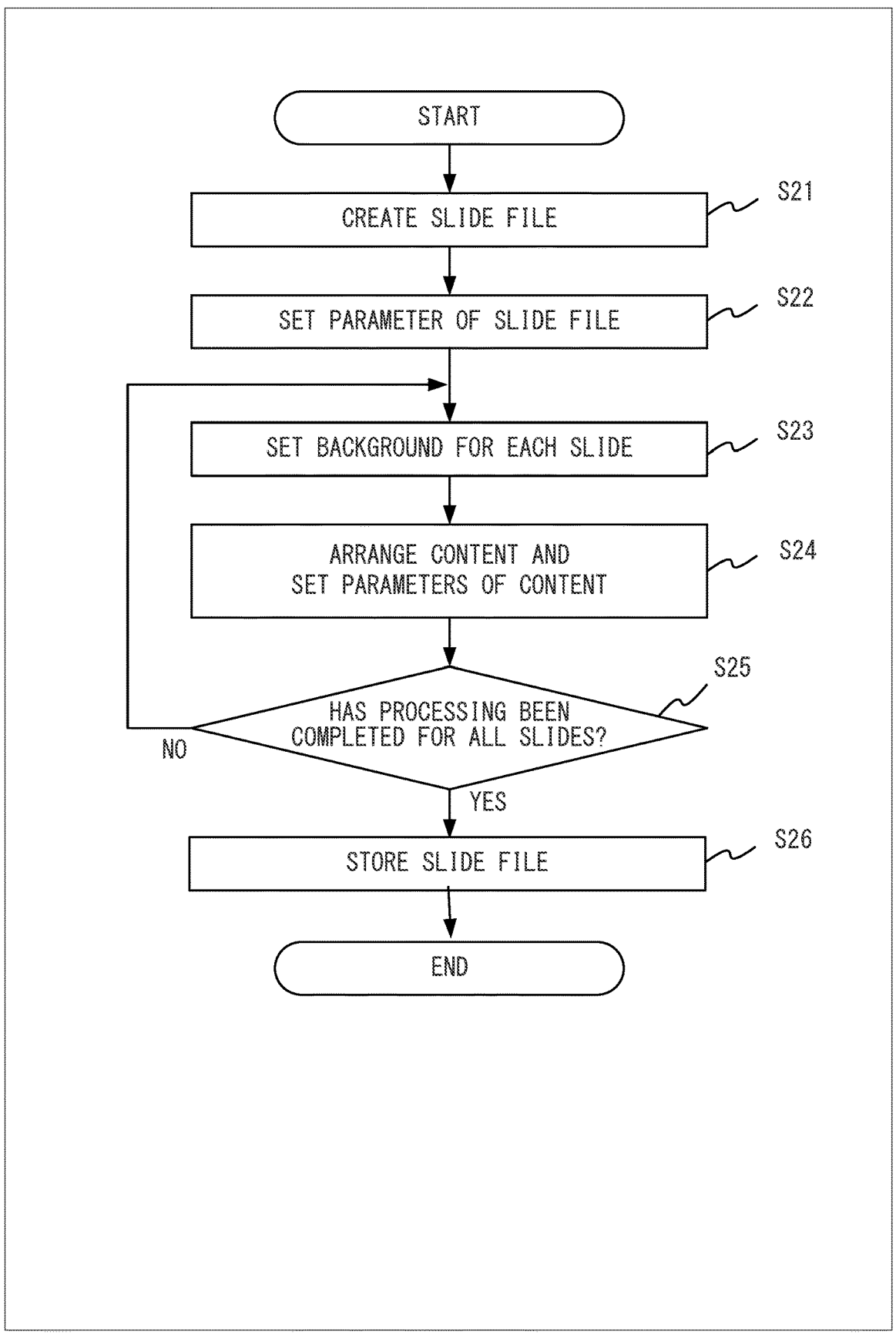
FIG. 36 is an example of a flowchart of a process of creating a slide set.
Figure 37:
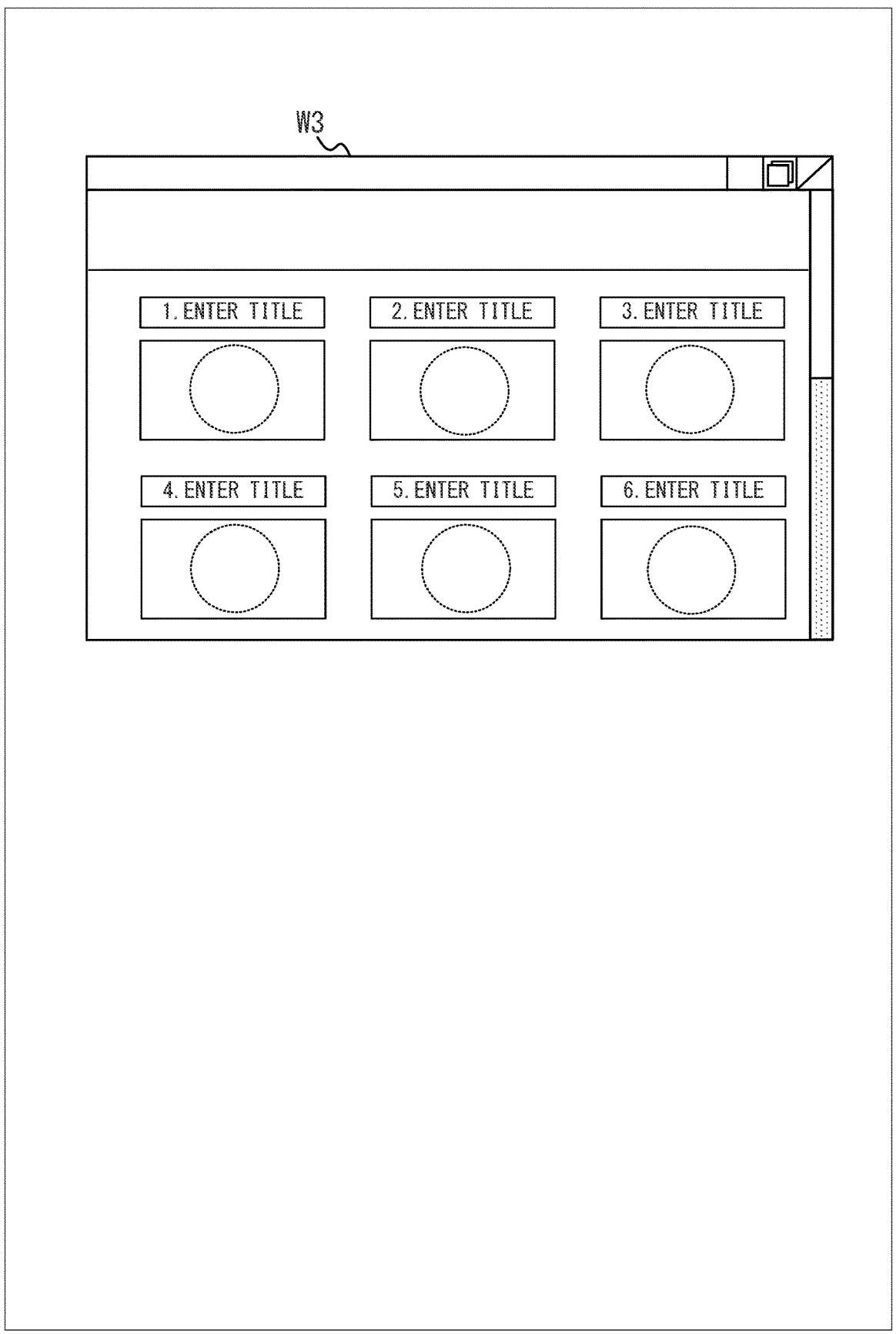
FIG. 37 is a diagram illustrating an example of a screen for setting a parameter of a slide file.
Figure 38:
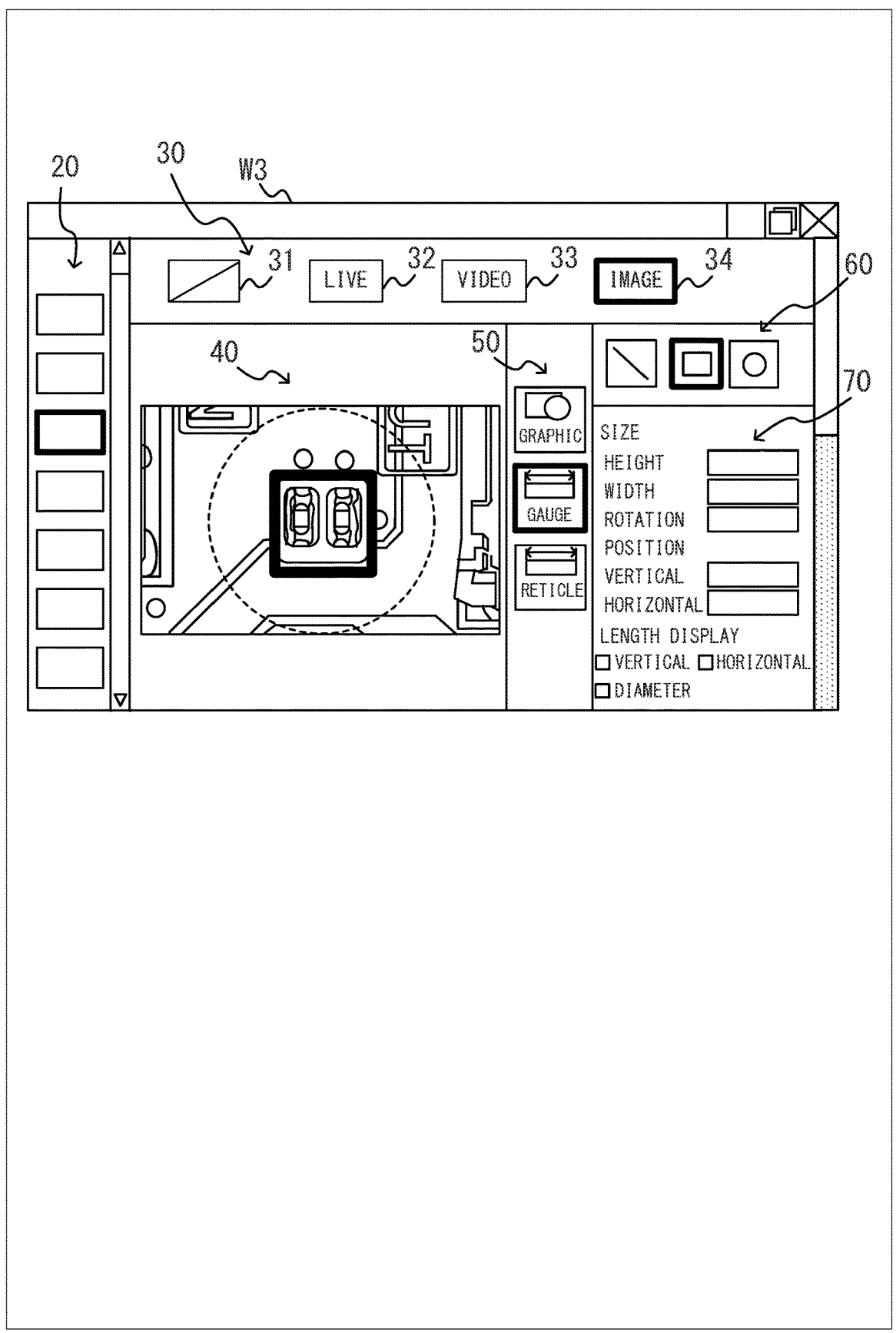
FIG. 38 is a diagram illustrating an example of a slide setting screen.

FIG. 36 is an example of a flowchart of a process of creating a slide set. FIG. 37 is a diagram illustrating an example of a screen for setting a parameter of a slide file. FIG. 38 is a diagram illustrating an example of a slide setting screen. The procedure manual mode of the work support application will be described below with reference to FIGS. 36 to 38.

The procedure manual mode is started when the user presses a new creation button for creating a procedure manual or an edit button on the home screen displayed on the monitor 300 as illustrated in FIG. 6. When the new creation button is pressed and the procedure manual mode is started, the control device 200 starts the process of creating a slide set as illustrated in FIG. 36.

First, the control device 200 newly creates a slide file (step S21). When the slide file is created, the control device 200 sets a parameter of the slide file according to input from the user (step S22). For example, the user can designate the number of slides by adding or deleting a slide in a window W3 illustrated in FIG. 37. In addition, the order of these slides can be designated by interchanging the slides.

After setting the parameter of the slide file, the control device 200 creates slides one by one according to the input from the user. Specifically, the control device 200 repeats the setting of a background (step S23), the arrangement of content, and the setting of content parameters (step S24) for each slide.

In step S23, the control device 200 sets a background to a slide selected by the user from a region 20 of the window W3 illustrated in FIG. 38. Specifically, when the user presses a button 31 in a region 30, the control device 200 does not set anything for the background of the slide. When the user presses a button 32, the control device 200 sets a live image acquired by the imaging device 112 on the background of the slide. When the user presses a button 33, the control device 200 sets a moving image acquired in advance on the background of the slide. When the user presses a button 34, the control device 200 sets a still image acquired in advance on the background of the slide. FIG. 38 illustrates a state in which the still image acquired in advance is displayed in a region 40 displaying the slide selected in the region 20 as a result of pressing the button 34 by the user.

Setting the live image on the background is particularly suitable in a case where the sample to be used in the working mode can be prepared when a slide set is to be created in the procedure manual mode. By creating a slide while displaying the sample to be actually used in the working mode as the live image, it is possible to arrange content at an appropriate position and size according to the sample in step S24.

In addition, setting the still image or the live image on the background is particularly suitable in a case where the sample to be used in the working mode cannot be prepared in a case where the slide set is created in the procedure manual mode. Even in a case where the sample cannot be prepared, by creating a slide with a still image or a moving image obtained by imaging the sample in advance as the background, it is possible to arrange content at an appropriate position and size according to the sample in step S24.

Note that the background set in step S23 is used for the user to easily perform the work of arranging and setting the content in step S24. That is, the background set here is used only for creating and editing slides, and the background set here is not displayed in the auxiliary image projected in the work mode.

In step S24, the control device 200 arranges the content on the slide in which the background is set in step S23, and sets the parameters of the content. Specifically, the control device 200 arranges the content on the slide according to the input from the user, and incorporates the content as a component of the slide.

The type of content to be arranged on the slide can be selected in a region 50. When the type of content is selected from the region 50, further subdivided content (also referred to as an object) belonging to the content can be selected from a region 60.

For example, when graphic content is selected in the region 50, content such as a line, an arrow, a square, a circle, a text, an image (still image), and a video (moving image) can be selected from the region 60. In addition, when gauge content is selected in the region 50, for example, content such as a linear gauge, a rectangular gauge, or a circular gauge can be selected from the region 60. Also, when reticle content is selected in the region 50, content such as, for example, a cross reticle, a grid reticle, or the like may be selected from the region 60. FIG. 38 illustrates a state in which, as a result of the user selecting the gauge content in the region 50 and further selecting the rectangular gauge in the region 60, the rectangular gauge is arranged as the content in the region 40 displaying the slide selected in the region 20.

The parameters of the content can be set in a region 70. As the parameters of the content, a height, a width, a rotation (orientation), a vertical position, a horizontal position, and the like can be set. In the case of a gauge or a reticle, whether or not to display the length can also be set as a parameter. Note that the parameters of the content may be set by moving or scaling the content in the region 40. Note that parameters of each piece of content are not limited to those exemplified here. Each piece of content may include other parameters such as color, line width, line type, and the like.

When the processing of steps S23 and S24 is completed for all the slides, the control device 200 stores the slide file (step S25), and ends the process of creating a slide set illustrated in FIG. 36. As described above, in the microscope system 1, the control device 200 creates a new slide set according to the operation on the creation screen displayed on the monitor 300 serving as the display device.

Note that although FIG. 36 illustrates the process of newly creating a slide set, the process of editing the slide set is basically similar to the process illustrated in FIG. 36. In a case where the slide file is edited, an existing slide file is read in the region 20 in step S21 instead of newly creating a slide file, and the subsequent processing is performed. That is, in the microscope system 1, the control device 200 edits the existing slide set according to an operation on an editing screen displayed on the monitor 300 serving as the display device.

As described above, according to the microscope system 1, the user can freely create and edit the slide set to be used as the procedure manual by using the procedure manual mode. By using the slide set that has been created in the procedure manual mode and in which the user arranges the necessary information in the necessary order, the microscope system 1 can provide the user with appropriate information at a necessary timing during the work under the microscope in the work mode.

Figure 39:
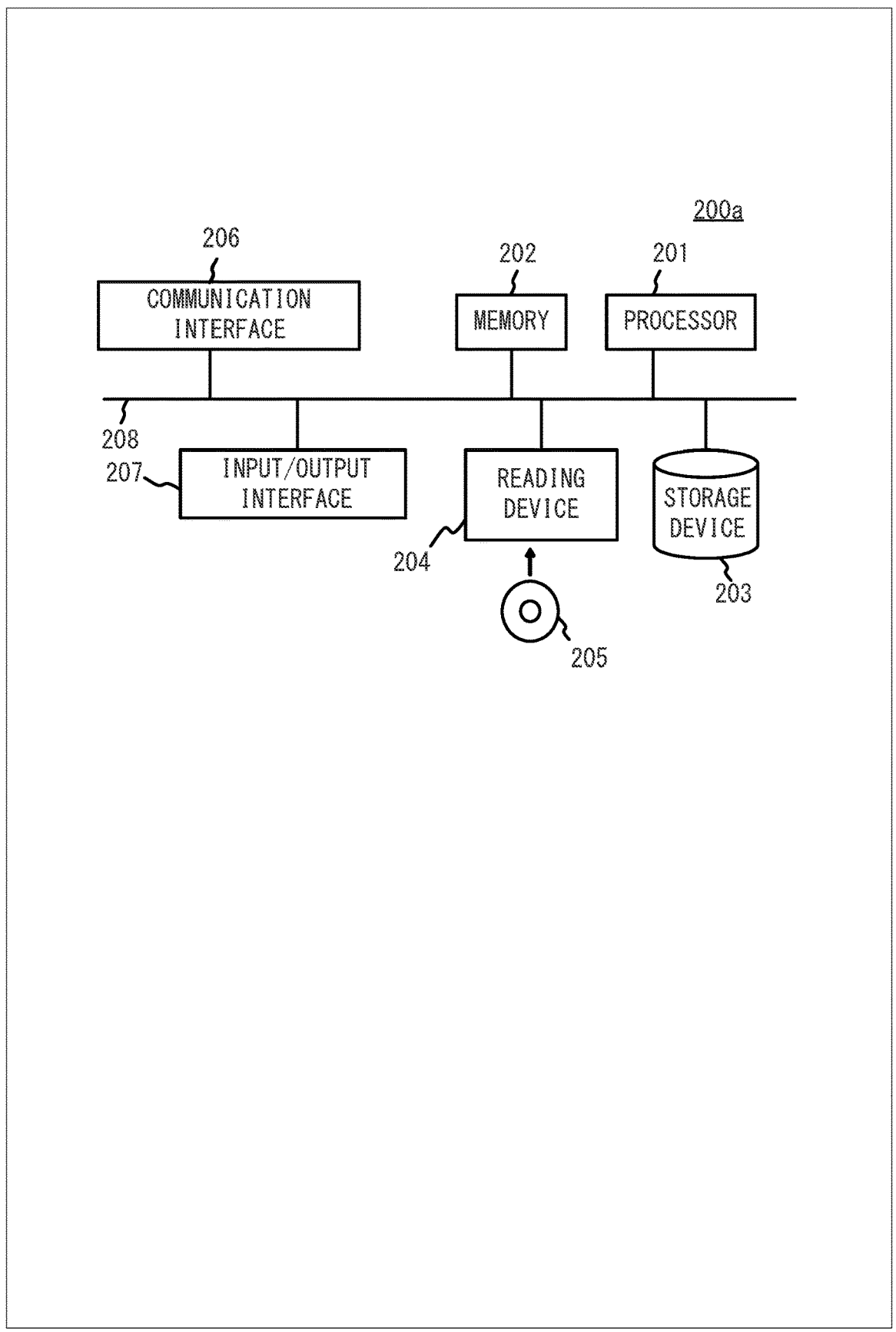
FIG. 39 is a diagram illustrating a hardware configuration of a computer for implementing a control device.

FIG. 39 illustrates an exemplary hardware configuration of a computer 200a for implementing the control device 200 according to the embodiment described above. The computer 200a having the hardware configuration illustrated in FIG. 39 includes, for example, a processor 201, a memory 202, a storage device 203, a reading device 204, a communication interface 206, and an input/output interface 207. Note that the processor 201, the memory 202, the storage device 203, the reading device 204, the communication interface 206, and the I/O interface 207 are connected to one another, for example, via a bus 208.

The processor 201 may be, for example, a single processor, a multiprocessor, or a multi-core processor. The processor 201 reads a program stored in the storage device 203 and executes the program, thereby performing the control processes illustrated in FIGS. 12, 36, and the like.

The memory 202 is, for example, a semiconductor memory and may include a RAM area and a ROM area. For example, the storage device 203 is a hard disk, a semiconductor memory such as a flash memory, or an external storage device.

For example, the reading device 204 accesses a removable recording medium 205 in accordance with an instruction of the processor 201. For example, the removable recording medium 205 is implemented by a semiconductor device, a medium to and from which information is input and output by a magnetic effect, a medium to and from which information is input and output by an optical effect, or the like. Note that the semiconductor device is, for example, a Universal Serial Bus (USB) memory. Such a medium to and from which information is input and output by a magnetic effect is, for example, a magnetic disk. Such a medium to and from which information is input and output by an optical effect is, for example, a compact disc (CD)-ROM, a digital versatile disc (DVD), or a Blu-ray disc (Blu-ray is a registered trademark).

The communication interface 206 communicates with other devices (for example, the microscope 100, the web camera 500, and the like) according to an instruction of the processor 201, for example. The input/output interface 207 is, for example, an interface between the input devices 400 and an output device. The input devices 400 are, for example, devices such as the mouse 401, the keyboard 402, the foot switch 403, and the like that receive an instruction from the user. The output device is, for example, the monitor 300 and an audio device such as a speaker.

For example, the program that the processor 201 executes is provided to the computer in the following forms:
(1) Installed in the storage device 203 in advance
(2) Provided by the removable recording medium 205
(3) Provision from a server, such as a program server.

Note that the hardware configuration of the computer for implementing the control device 200, described with reference to FIG. 39, is exemplary and thus the embodiment is not limited to this. For example, a part of the configuration described above may be omitted or a new configuration may be added to the configuration described above. Furthermore, in another embodiment, for example, some or all of the functions of the above-described processing device may be implemented as hardware such as a field programmable gate array (FPGA), a system-on-a-chip (SoC), an application specific integrated circuit (ASIC), a programmable logic device (PLD), or the like.

The embodiments described above are specific examples for facilitating understanding of the invention, and thus the present invention is not limited to the embodiments. Modifications of the embodiments described above and alternatives to the embodiments described above are to be included. That is, the constituent elements in each embodiment can be modified without departing from the spirit and scope of the embodiment. A new embodiment can be implemented by appropriately combining a plurality of constituent elements disclosed in one or more of the embodiments. Some constituent elements may be omitted from the constituent elements in each embodiment, or some constituent elements may be added to the constituent elements in each embodiment. Furthermore, the process procedure in each embodiment may be changed in order as long as there is no contradiction. That is, the microscope system, the superimposing unit, and the operation method of the present invention can be variously modified and changed without departing from the scope of the claims.

In the above-described embodiment, the example in which the control device 200 that controls the operation of the entire microscope system 1 generates the auxiliary image data has been described, but the auxiliary image data may be generated by a control device provided in the ocular tube 120. That is, the ocular tube 120 attached to the microscope 100 may function as a superimposing unit including a control device that generates auxiliary image data based on information regarding a target slide selected from among a plurality of ordered slides included in a slide set, and a superimposing device that superimposes, based on the auxiliary image data, an auxiliary image including the target slide on an image plane on which an optical image is formed.

Furthermore, although not particularly mentioned in the above-described embodiment, the image plane (AR screen) of the microscope optical system 110 on which an auxiliary image is projected may be a screen on which the content of a slide displayed on the monitor 300 is mirrored, or a part of video displayed on the monitor 300 may be projected on the image plane as the auxiliary image. Furthermore, the mouse cursor displayed on the monitor 300 may be projected onto the auxiliary image as a pseudo mouse cursor. The pseudo mouse cursor does not need to be constantly projected, and for example, when the pseudo mouse cursor does not move for a certain period of time, the pseudo mouse cursor may be deleted from the auxiliary image. Accordingly, it is possible to prevent unnecessary display of the pseudo mouse cursor from hindering concentration of the user. Further, the position of the pseudo mouse cursor does not necessarily match the position of the mouse cursor displayed on the monitor 300. For example, when the mouse cursor on the monitor 300 moves out of the field of view of the microscope optical system 110, the pseudo mouse cursor may be displayed at an end of the field of view. As a result, it is possible to avoid a situation in which the user loses sight of the pseudo mouse cursor due to the movement of the pseudo mouse cursor to the outside of the field of view.

Figure 40:
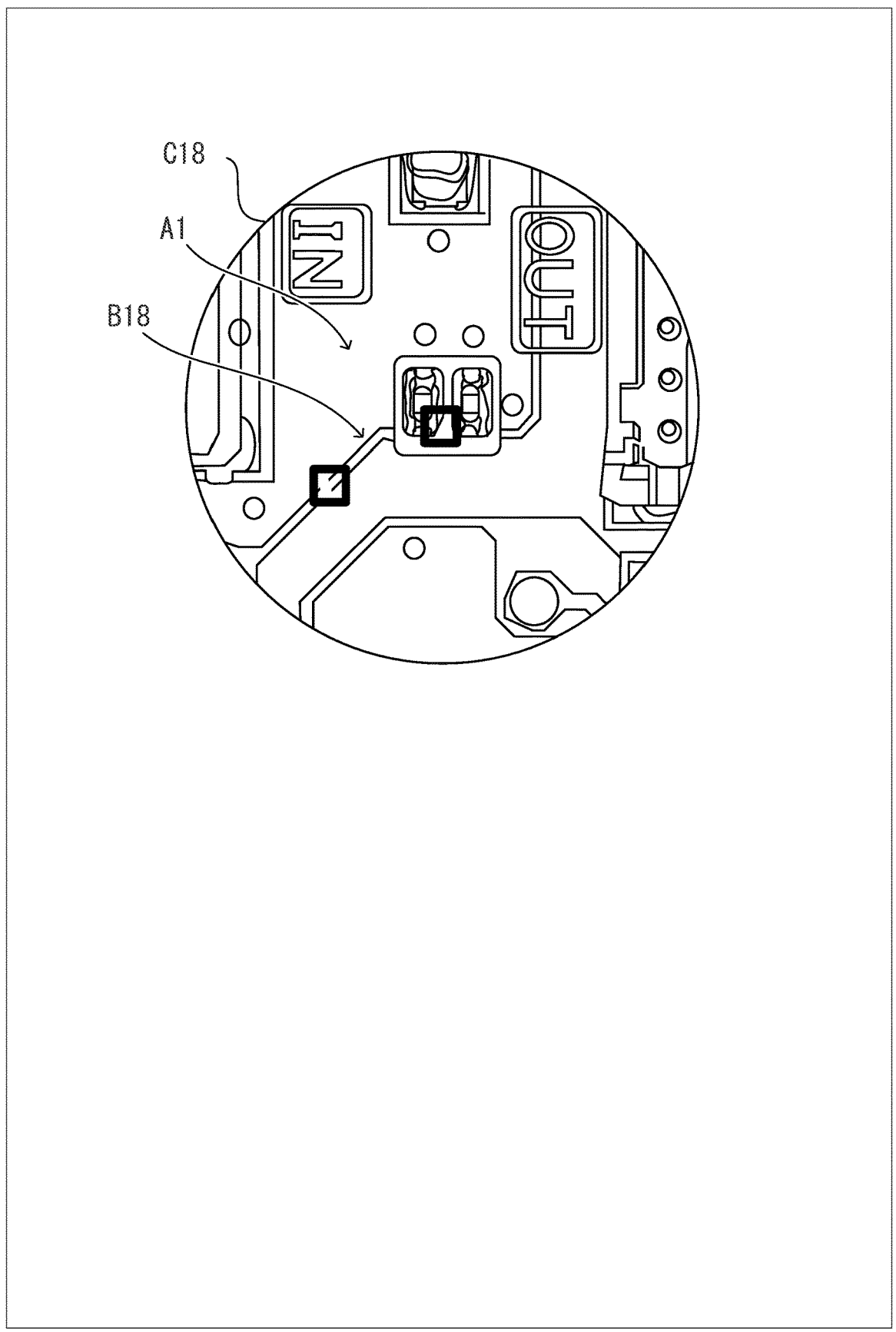
FIG. 40 is a diagram illustrating still another example of the superimposed image observed from the ocular lens.
Figure 41:
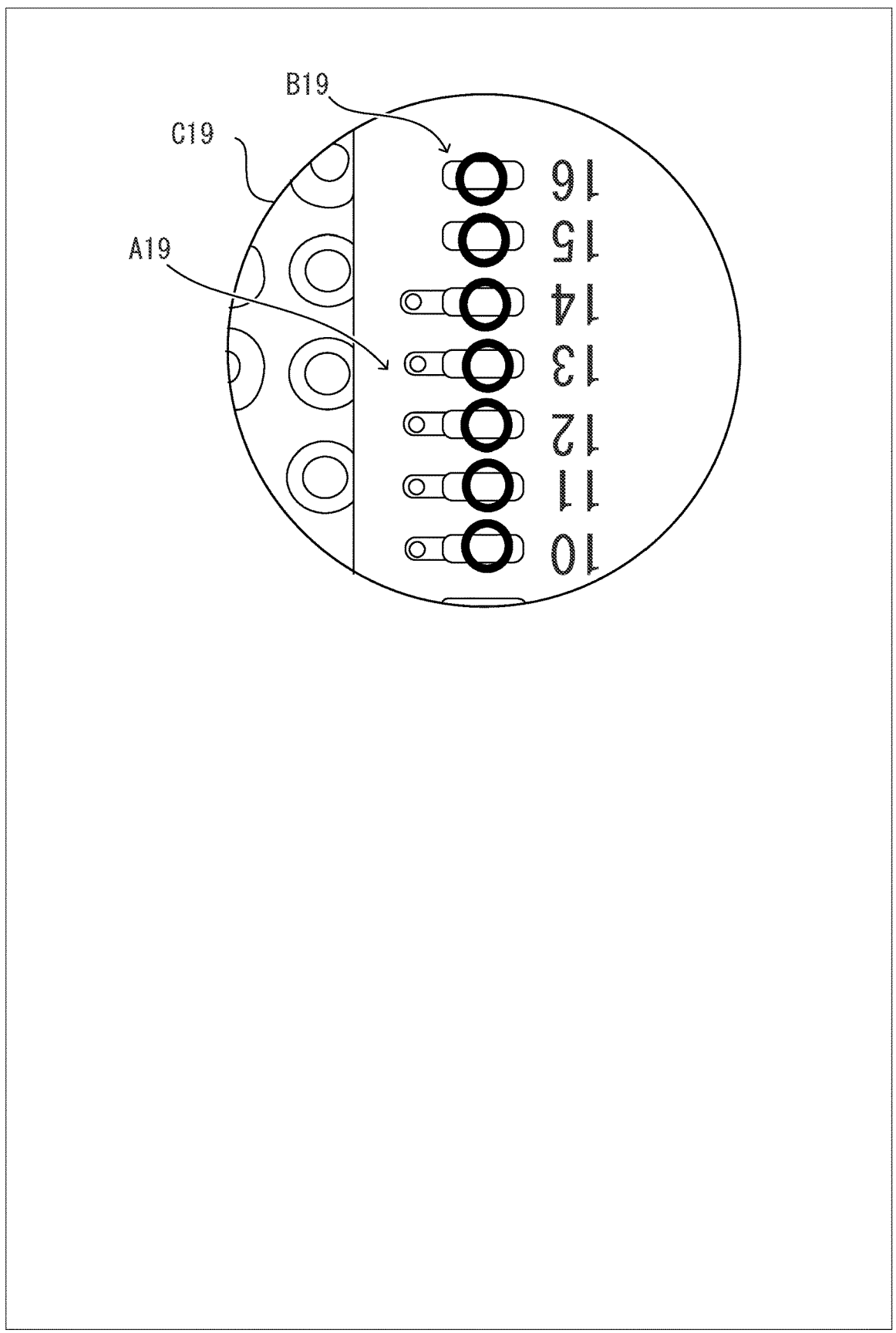
FIG. 41 is a diagram illustrating still another example of the superimposed image observed from the ocular lens.

Although not particularly mentioned in the above-described embodiment, the auxiliary image may be generated using a learned model created by machine learning such as deep learning. The slide set may include, for example, a slide including content (hereinafter, AI content) obtained by inputting a digital image acquired by the imaging device 112 to the learned model. Specifically, for example, a defect of the sample may be detected from the digital image by using a learned model that has learned the defect of the sample to be inspected, and as illustrated in FIG. 40, an auxiliary image B18 including a bounding box indicating the position of the defect may be output. In addition, the AI content is not limited to content to be used for inspection purposes and may be intended for work support. For example, a region to be soldered may be detected from the digital image by using a learned model that has learned a region requiring soldering, and as illustrated in FIG. 41, an auxiliary image B19 including a bounding box indicating the detected region may be output. Note that the shape of the bounding box is not particularly limited, and may be a rectangle as illustrated in FIG. 40 or a circle as illustrated in FIG. 41. The slide set may include a plurality of slides including AI content corresponding to the work process, and the user may appropriately switch between the plurality of slides to provide necessary information to the user using various learned models.

In the present specification, the expression "based on A" does not indicate "based on only A" but indicates "based on at least A" and further indicates "based partially on at least A". That is, "based on A" may be "based on B in addition to A" or "based on part of A".

What is claimed is:
1. A microscope system comprising:
a microscope optical system that includes an ocular lens and forms an optical image of a sample on an object side of the ocular lens;
a memory that stores a slide set including a plurality of slides in a predetermined order based on a work procedure;

a processor that generates auxiliary image data based on information regarding a target slide selected from among the plurality of ordered slides included in the slide set; and a superimposing device that superimposes, based on the auxiliary image data, an auxiliary image including the target slide on an image plane on which the optical image is formed, wherein the processor selects, in response to an instruction to switch the target slide, a new target slide determined based on the predetermined order in which the plurality of slides stored in the memory are ordered, and switches the target slide to the new target slide.

2. The microscope system according to claim 1, wherein the processor generates the auxiliary image data based on magnification information of the microscope optical system and information regarding the target slide.

3. The microscope system according to claim 2, wherein: the target slide includes one or more pieces of content, and the processor is further configured to:

generate the auxiliary image data such that content of a first classification among the one or more pieces of content is included in the auxiliary image in a size according to the magnification information, and generate the auxiliary image data such that content of a second classification among the one or more pieces of content is included in the auxiliary image in a predetermined size.

4. The microscope system according to claim 3, wherein the content of the first classification includes at least one of a gauge and a reticle.

5. The microscope system according to claim 3, wherein the one or more pieces of content include at least one of a pen, a figure, a text, a still image, a moving image, a gauge, a reticle, an image analysis result, a timer, a dashboard, external device information, and content for measurement.

6. The microscope system according to claim 1, further comprising an input device that inputs the instruction to switch the target slide.

7. The microscope system according to claim 6, wherein the input device includes at least one of a mouse, a keyboard, a switch provided on a handle, a foot switch, and a microphone.

8. The microscope system according to claim 1, further comprising:

an acquisition device that acquires identification information for identifying the slide set, wherein the processor acquires the slide set based on the identification information acquired by the acquisition device.

9. The microscope system according to claim 8, wherein the acquisition device includes at least one of a one-dimensional code reader, a two-dimensional code reader, an RF tag reader, and an imaging device.

10. The microscope system according to claim 1, further comprising:

an imaging device that captures an image of the sample; and a recording device, wherein the processor causes the recording device to record the image of the sample captured by the imaging device in association with the auxiliary image.

11. The microscope system according to claim 1, wherein: the processor generates annotation image data according to a drawing instruction, and the superimposing device superimposes an annotation image corresponding to the annotation image data on the image plane.

12. The microscope system according to claim 11, further comprising:

an imaging device that captures an image of the sample; and a recording device, wherein the processor causes the recording device to record the image of the sample captured by the imaging device in association with the auxiliary image and the annotation image.

13. The microscope system according to claim 1, further comprising:

an imaging device that captures an image of the sample, wherein the processor selects, as the new target slide, a slide determined according to an analysis result of the image of the sample captured by the imaging device.

14. The microscope system according to claim 1, further comprising an ocular tube to which the ocular lens is attached.

15. The microscope system according to claim 1, further comprising:

a display device, wherein the processor edits the slide set according to an operation on an edit screen displayed on the display device.

16. The microscope system according to claim 1, further comprising:

a display device, wherein the processor creates a new slide set according to an operation on a creation screen displayed on the display device.

17. The microscope system according to claim 1, wherein the microscope optical system is an optical system for a stereomicroscope.

18. The microscope system according to claim 1, wherein: the slide set comprises information for supporting assembly of precision equipment, and each of the plurality of slides comprises information on a respective step of the assembly of the precision equipment.

19. The microscope system according to claim 1, wherein the plurality of slides include a slide including AI content obtained by inputting an image of the sample into a trained machine learning model.

20. A superimposing unit attached to a microscope including a microscope optical system that forms an optical image of a sample on an object side of an ocular lens, the superimposing unit comprising:

a memory that stores a slide set including a plurality of slides in a predetermined order based on a work procedure;

a processor that generates auxiliary image data based on information regarding a target slide selected from among the plurality of ordered slides included in the slide set; and a superimposing device that superimposes, based on the auxiliary image data, an auxiliary image including the target slide on an image plane on which the optical image is formed, wherein the processor selects, in response to an instruction to switch the target slide, a slide determined based on the predetermined order in which the plurality of slides stored in the memory are ordered, and switches the target slide to the selected slide as a new target slide.

21. An operation method of a control device that controls a microscope including a superimposing device and a microscope optical system that forms an optical image of a sample on an object side of an ocular lens, the operation method comprising:
- storing, in a memory of the control device, a slide set including a plurality of slides in a predetermined order based on a work procedure;
- selecting, by a processor of the control device in response to an instruction to switch a target slide selected from among the plurality of ordered slides included in the slide set, a new target slide determined based on the predetermined order in which the plurality of slides stored in the memory are ordered, and switching the target slide to the new target slide;
- generating, by the processor, auxiliary image data based on information regarding the new target slide; and
- superimposing, by the superimposing device based on the auxiliary image data, an auxiliary image including the new target slide on an image plane on which the optical image is formed.

* * * * *